US012755678B2

(12) United States Patent
Lee et al.

(10) Patent No.: US 12,755,678 B2
(45) Date of Patent: Oct. 6, 2026

(54) DISPLAY DEVICE AND METHOD OF DRIVING THE SAME, AND ELECTRONIC DEVICE

(71) Applicant: Samsung Display Co., Ltd., Yongin-Si (KR)

(72) Inventors: Hyun Dae Lee, Yongin-si (KR); Jung Woo Park, Yongin-si (KR); Kang Bin Jo, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 19/197,152

(22) Filed: May 2, 2025

(65) Prior Publication Data

US 2026/0045203 A1 Feb. 12, 2026

(30) Foreign Application Priority Data

Aug. 7, 2024 (KR) ........................ 10-2024-0105418

(51) Int. Cl.
*G09G 3/32* (2016.01)

(52) U.S. Cl.
CPC ....... *G09G 3/32* (2013.01); *G09G 2300/0819* (2013.01); *G09G 2310/0267* (2013.01); *G09G 2330/021* (2013.01); *G09G 2330/06* (2013.01); *G09G 2360/142* (2013.01)

(58) Field of Classification Search
CPC ............. G09G 3/32; G09G 2300/0819; G09G 2310/0267; G09G 2330/021; G09G 2330/06; G09G 2360/142; G09G 3/3233; G09G 3/3266; G09G 3/20; G09G 3/006; G09G 2310/0202; G09G 2310/0243; G09G 2310/0264; G09G 2320/0233; G09G 2320/0626; G09G 2330/12; G09G 2360/14; G09G 2300/0426; G09G 2300/0809; G09G 2310/08; G06F 3/0416; G06F 3/04164; G06V 40/12; G06V 40/13; G06V 40/1341; H10K 59/60
See application file for complete search history.

(56) References Cited

U.S. PATENT DOCUMENTS

| | | | |
|---|---|---|---|
| 11,574,972 | B2 | 2/2023 | Kang et al. |
| 11,631,729 | B2 | 4/2023 | Lee et al. |
| 11,694,612 | B2 | 7/2023 | Lee et al. |

(Continued)

FOREIGN PATENT DOCUMENTS

| | | | |
|---|---|---|---|
| CN | 117037706 | A | 11/2023 |
| KR | 1020210029339 | A | 3/2021 |

(Continued)

*Primary Examiner* — Andrew Sasinowski
(74) *Attorney, Agent, or Firm* — Innovation Counsel LLP

(57) ABSTRACT

A display device includes sub-pixels connected to scan lines and data lines, light-sensing pixels connected to sensing scan lines, readout lines, and a reset control line, a scan driver supplying a scan signal to the scan lines, and a controller supplying a start signal to the scan driver. The controller may supply the start signal at a first time point after a start of a frame during some frame periods among a plurality of frame periods in which a sensing signal is detected from the light-sensing pixels, and supply the start signal at a second time point different from the first time point after the start of the frame during remaining frame periods.

20 Claims, 21 Drawing Sheets

(56) References Cited

U.S. PATENT DOCUMENTS

| | | | | |
|---|---|---|---|---|
| 11,983,364 | B2 * | 5/2024 | Kim | G06F 3/03545 |
| 12,106,601 | B2 | 10/2024 | Kim et al. | |
| 2019/0155433 | A1 * | 5/2019 | Park | G06F 3/0416 |
| 2021/0165518 | A1 * | 6/2021 | Shin | G06F 3/0412 |
| 2025/0391298 | A1 * | 12/2025 | Back | G09G 3/006 |

FOREIGN PATENT DOCUMENTS

| | | | |
|---|---|---|---|
| KR | 1020210137336 | A | 11/2021 |
| KR | 1020230041905 | A | 3/2023 |
| KR | 1020230157565 | A | 11/2023 |

* cited by examiner

DISPLAY DEVICE AND METHOD OF DRIVING THE SAME, AND ELECTRONIC DEVICE

CROSS-REFERENCE TO RELATED APPLICATION

This application claims priority to and the benefit of Korean Patent Application No. 10-2024-0105418, filed on Aug. 7, 2024, the entire content of which is hereby incorporated by reference.

BACKGROUND

1. Field

The present disclosure relates to a display device and a method of driving the same, and electronic device including the display device.

2. Discussion

As the information society advances, the demand for display devices for displaying images have increased in various forms. For example, display devices have been applied to various electronic devices such as smartphones, digital cameras, laptops, navigation systems, and smart televisions.

A display device may include light-sensing pixels on a display panel to detect a fingerprint or illuminance. When the display panel includes light-sensing pixels, there is a need for a method of improving the accuracy of image sensing.

SUMMARY

Embodiment according to the present disclosure provide a display device and a method of driving the same that can improve the accuracy of image sensing.

According to an embodiment, a display device includes sub-pixels connected to scan lines and data lines, light-sensing pixels connected to sensing scan lines, readout lines, and a reset control line, a scan driver supplying a scan signal to the scan lines, and a controller supplying a start signal to the scan driver. The controller may supply the start signal at a first time point after a start of a frame during some frame periods among a plurality of frame periods in which a sensing signal is detected from the light-sensing pixels, and supply the start signal at a second time point different from the first time point after the start of the frame during remaining frame periods.

According to an embodiment, the controller may supply the start signal at the first time point during a frame period in which the sensing signal is not detected.

According to an embodiment, the second time point may be a time point shifted by one horizontal period compared to the first time point.

According to an embodiment, the second time point may be a time point one horizontal period earlier than the first time point.

According to an embodiment, in response to the shift of the start signal, a clock signal supplied to the scan driver may be shifted by one horizontal period.

According to an embodiment, the some frame periods may be even-numbered frame periods among the plurality of frame periods, and the remaining frame periods may be odd-numbered frame periods.

According to an embodiment, the some frame periods may be odd-numbered frame periods among the plurality of frame periods, and the remaining frame periods may be even-numbered frame periods.

According to an embodiment, each of the sub-pixels may include a light emitting element disposed between a first power source line and a second power source line, a first transistor having a gate electrode connected to a first node, a first electrode connected to a second node, and a second electrode connected to a third node, a second transistor connected between a data line among the data lines and the second node, and having a gate electrode connected to a first scan line among the scan lines, and a third transistor connected between the first node and a third power source line, and having a gate electrode connected to a second scan line among the scan lines.

According to an embodiment, the scan driver may include a write driver supplying a first scan signal to the first scan line, and an initialization driver supplying a second scan signal to the second scan line.

According to an embodiment, the start signal may be supplied to the initialization driver.

According to an embodiment, the initialization driver may supply the second scan signal at different time points during the some frame periods and the remaining frame periods.

According to an embodiment, each of the sub-pixels may further include a fourth transistor connected between the first node and the third node, and having a gate electrode connected to a third scan line among the scan lines, a fifth transistor connected between the first power source line and the second node, and having a gate electrode connected to an emission control line, a sixth transistor connected between the third node and a first electrode of the light emitting element, and having a gate electrode connected to the emission control line, and a seventh transistor connected between the first electrode of the light emitting element and a fourth power source line, and having a gate electrode connected to a fourth scan line among the scan lines.

According to an embodiment, each of the light-sensing pixels may include a first sensor transistor having a first electrode connected to a power source line to which a common voltage is supplied and a gate electrode connected to a sensor node, a second sensor transistor connected between a power source line to which a reset voltage is supplied and the sensor node, and having a gate electrode connected to the reset control line, a third sensor transistor connected between the first sensor transistor and a readout line among the readout lines, and having a gate electrode connected to a sensing scan line among the sensing scan lines, and a light receiving element connected between the sensor node and the second power source line.

According to an embodiment, the display device may further include a reset circuit supplying a reset signal to the reset control line, and a readout circuit receiving the sensing signal from the readout lines.

According to an embodiment, the readout circuit may receive the sensing signal from the light-sensing pixels disposed on some odd-numbered horizontal lines during a first frame period among the plurality of frame periods, receive the sensing signal from the light-sensing pixels disposed on some even-numbered horizontal lines during a second frame period among the plurality of frame periods, receive the sensing signal from the light-sensing pixels disposed on remaining odd-numbered horizontal lines during a third frame period among the plurality of frame periods, and receive the sensing signal from the light-sensing pixels disposed on remaining odd-numbered horizontal lines during a fourth frame period among the plurality of frame periods.

According to an embodiment, the display device may further include a substrate including a display area including a first area and a second area, and a non-display area, the data lines disposed in each of the first area and the second area, the readout lines disposed in each of the first area and the second area and spaced apart from the data lines, connection lines extending from the first area to the second area and electrically connected to the readout lines disposed in the second area, and bridge lines extending from the second area to the first area and electrically connected to the data lines disposed in the first area.

According to an embodiment of the present disclosure, a display device includes sub-pixels, each of the sub-pixels including a light emitting element, receiving a data signal from a data line when a first scan signal is supplied to a first scan line, and initializing a gate electrode of a driving transistor when a second scan signal is supplied to a second scan line, light-sensing pixels, each of light-sensing pixels including a light receiving element and detecting an external input, a write driver supplying the first scan signal to the first scan line in response to a write start signal, an initialization driver supplying the second scan signal to the second scan line in response to an initialization start signal, and a controller supplying the write start signal and the initialization start signal to the write driver and the initialization driver. The controller may not supply the initialization start signal to the initialization driver during a plurality of frame periods in which a sensing signal is detected from the light-sensing pixels.

According to an embodiment, the controller may not supply a clock signal to the initialization driver during the plurality of frame periods.

According to an embodiment, the write start signal may not be supplied to the write driver during the plurality of frame periods.

According to an embodiment of the present disclosure, an electronic device includes a processor to provide input image data, and a display device to display an image based on the input image data. The display device may include a sub-pixels connected to scan lines and data lines, light-sensing pixels connected to sensing scan lines, readout lines, and a reset control line, a scan driver supplying a scan signal to the scan lines, and a controller supplying a start signal to the scan driver. The controller may supply the start signal at a first time point after a start of a frame during some frame periods among a plurality of frame periods in which a sensing signal is detected from the light-sensing pixels, and supply the start signal at a second time point different from the first time point after the start of the frame during remaining frame periods.

Features of the present invention are not limited to the features mentioned above, and other technical features not mentioned above will be clearly understood by those skilled in the art from the description below.

BRIEF DESCRIPTION OF THE DRAWINGS

Embodiments of the present disclosure will now be described more fully hereinafter with reference to the accompanying drawings. However, the present disclosure may be implemented in different forms and should not be construed as limited to the embodiments set forth herein. Rather, the embodiments may be variously expanded without departing from the sprit and scope of the present disclosure.

DETAILED DESCRIPTION

Figure 1:
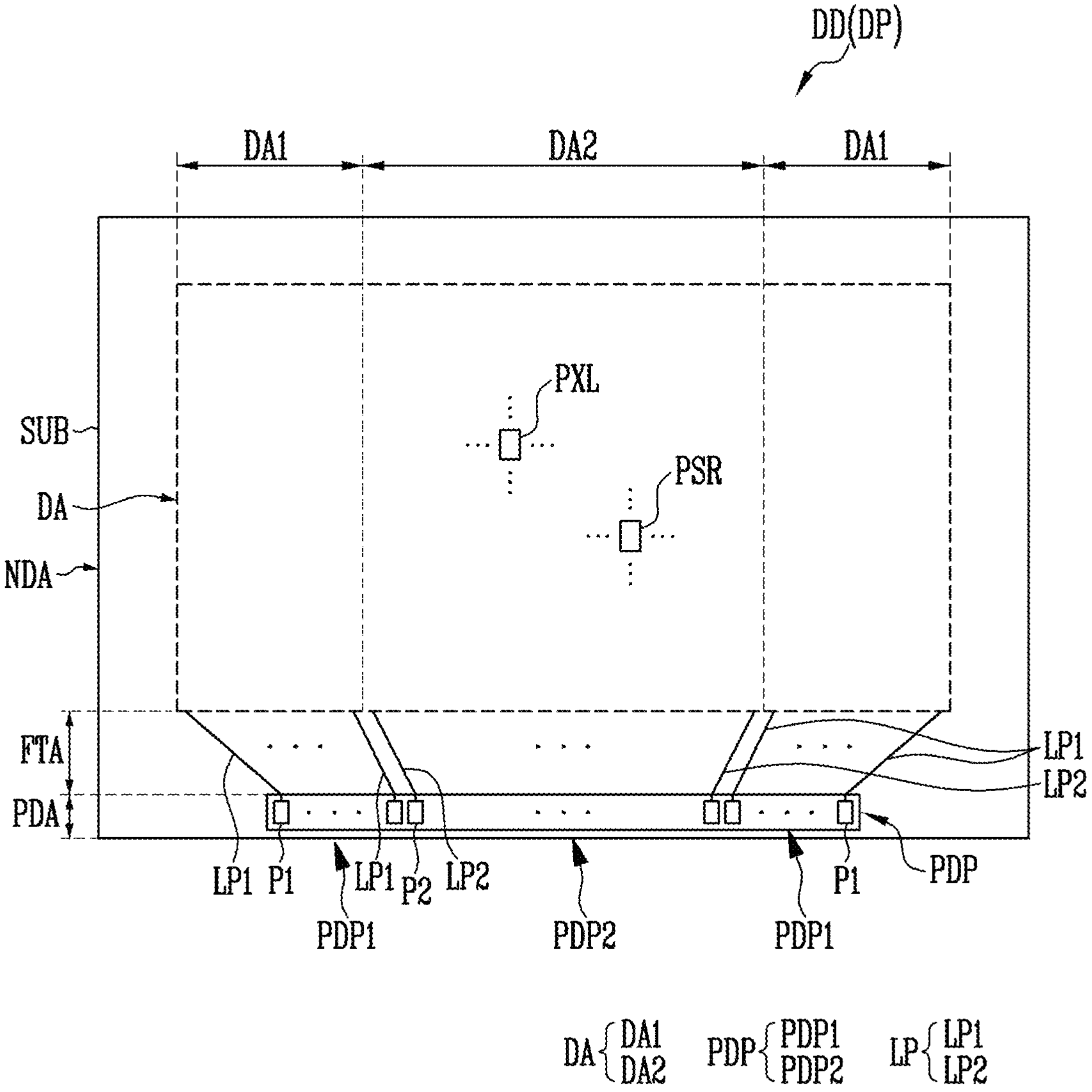
FIGS. 1 and 2 are plan views schematically illustrating a display device according to an embodiment.

Hereinafter, embodiments of the present disclosure will be described in detail with reference to the accompanying drawings in order for those of ordinary skill in the art to easily implement the present disclosure. The present disclosure may be embodied in various different forms and is not limited to the embodiments described herein.

In order to clearly describe the embodiments of the present disclosure, parts that are not related to the description are omitted, and the same or similar components are denoted by the same reference numerals throughout the specification. Therefore, the same reference numerals may be used in different drawings to identify the same or similar elements.

The size and thickness of each element shown in the drawings are arbitrarily shown for better understanding and for convenience of description, and thus the present disclosure is not necessarily limited to those shown in the drawings. In the drawings, thicknesses may be exaggerated to clearly illustrate the layers and regions.

In the present disclosure, the expression "the same" may mean not only "exactly same" but also "substantially the same". That is, it may be considered identical to the extent that those skilled in the art would perceive it as the same. Other expressions may be understood as implicitly including the term "substantially".

Some embodiments are described in the accompanying drawings in relation to functional block, unit, or module. Those skilled in the art will understand that such block, unit, or module is physically implemented by a logic circuit, an individual component, a microprocessor, a hard wire circuit, a memory element, a line connection, and other electronic circuits. This may be formed using a semiconductor-based manufacturing processes or other manufacturing steps. The block, unit, or module implemented by a microprocessor or other similar hardware may be programmed and controlled using software to perform various functions discussed herein, and may optionally be driven by firmware or software. In addition, each block, unit, or module may be implemented by dedicated hardware, or a combination of dedicated hardware that performs some functions and a processor (for example, one or more programmed microprocessors and related circuits) that performs a function different from those of the dedicated hardware. In an embodiment, the block, unit, or module may be physically separated into two or more individual blocks, units, or modules without departing from the scope of the inventive concept. In an embodiment, the block, unit or module may be physically combined into more complex blocks, units, or modules without departing from the scope of the inventive concept.

The term "connection" between two components may include either an electrical connection or a physical connection. For example, "connection" used to explain a circuit diagram may represent an electrical connection, and "connection" used in association with a cross-sectional view and a plan view may represent a physical connection.

It will be understood that, although "first", "second", and the like are used to describe various elements, these elements are not limited by these terms. These terms are used only to distinguish one element from another element. Therefore, a "first" element described below may be a "second" element within the technical spirit of the present disclosure.

The embodiment of the present disclosure is not limited to the embodiments disclosed below, and may be modified or implemented in various forms. Each embodiments disclosed below may be implemented independently or in combination with at least another embodiment of the present disclosure.

Figure 2:
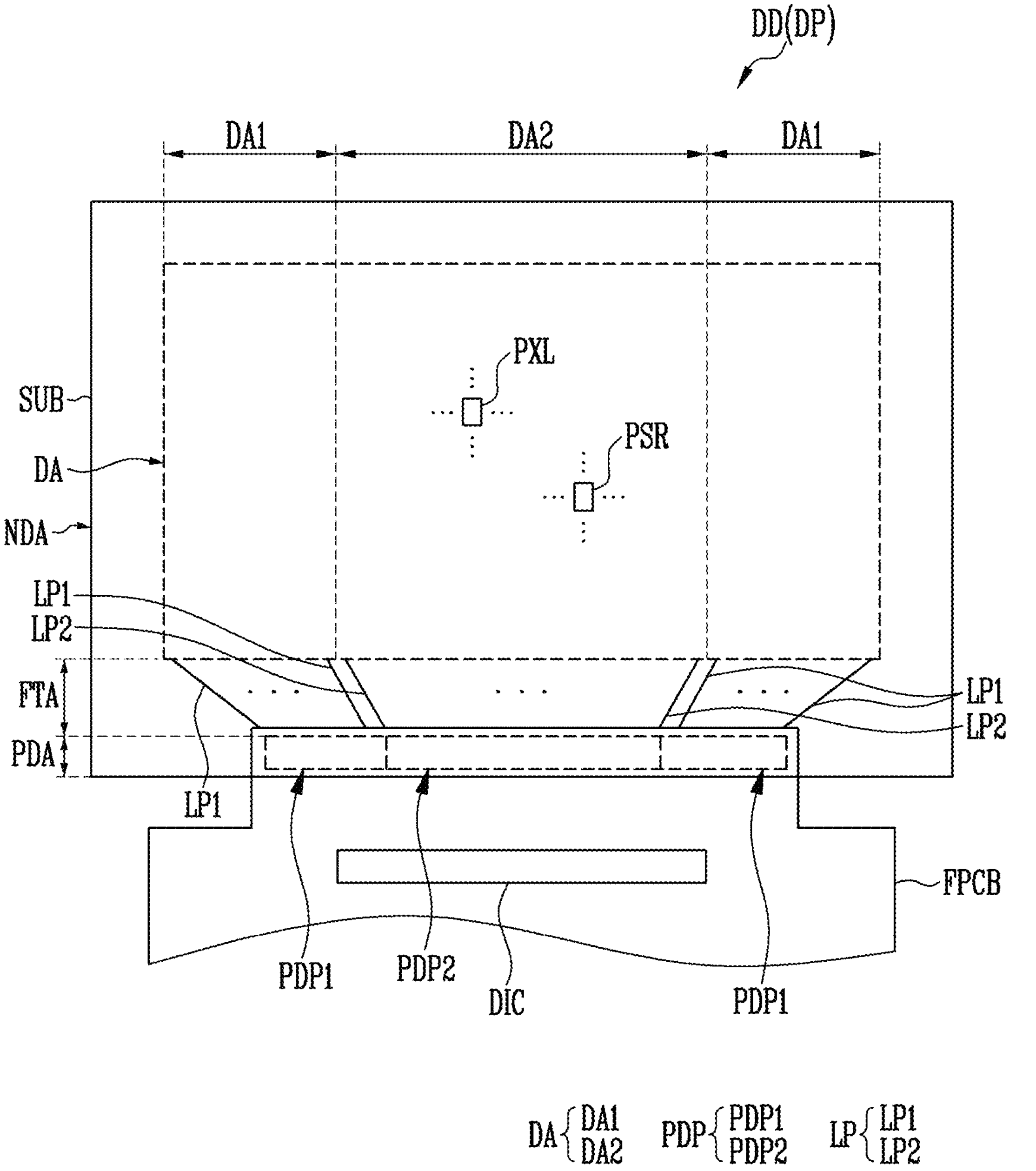

FIGS. 1 and 2 are plan views schematically illustrating a display device DD according to an embodiment.

In FIGS. 1 and 2, for convenience of description, the structure of the display device DD, for example, a display panel DP included in the display device DD, is briefly illustrated focusing on a display area DA where an image is displayed.

Referring to FIGS. 1 and 2, the display device DD (or display panel DP) may include a substrate SUB, sub-pixels PXL, and light-sensing pixels PSR.

The display device DD may be implemented in various shapes. For example, the display device DD may be provided in the shape of a rectangular plate having two pairs of parallel sides, but the present disclosure is not limited thereto. If the display device DD is an electronic device having a display surface, such as a smart phone, television, a tablet PC, a mobile phone, a video phone, an e-book reader, a desktop PC, a laptop PC, a netbook computer, a workstation, a server, a PDA, a portable multimedia player (PMP), an MP3 player, a medical device, a camera, or a wearable device, the present embodiment can be applied.

The substrate SUB may include a transparent insulating material to allow light to pass through. The substrate SUB may be a rigid substrate or a flexible substrate.

The rigid substrate may be, for example, one of a glass substrate, a quartz substrate, a glass ceramic substrate, and a crystalline glass substrate.

The flexible substrate may be one of a film substrate including a polymer organic material and a plastic substrate. For example, the flexible substrate may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, or cellulose acetate propionate.

The display device DD or the display panel DP may include a display area DA on which the sub-pixels PXL and the light-sensing pixels PSR are arranged, and a non-display area NDA surrounding the display area DA.

In an embodiment, the display area DA may include a first area DA1 and a second area DA2. For example, the display area DA may be divided into the first area DA1 and the second area DA2 based on the corresponding relationship between components of a line portion LP. For example, the first area DA1 may be a part of the display area DA adjacent to a first line LP1 of line portion LP, and the second area DA2 may be a part of the display area DA adjacent to a second line LP2 of the line portion LP.

The first area DA1 may be adjacent to the non-display area NDA where the first line LP1 is placed, and the second area DA2 may be adjacent to the non-display area NDA where the second line LP2 is placed.

The sub-pixels PXL and the light-sensing pixels PSR may be arranged in each of the first area DA1 and the second area DA2.

Each of the sub-pixels PXL may include a light emitting element including a light emitting layer. According to an embodiment, the light emitting element may include an organic light emitting diode or an inorganic light emitting diode having a size in the micro to nano scale (or meter) range, but the present disclosure is not limited thereto. The display device DD may display an image in the first area DA1 and the second area DA2 by driving the sub-pixels PXL in response to input image data.

The display area DA may include a sensing area capable of sensing a user's fingerprint or the like. For example, the first area DA1 and the second area DA2 may be set as sensing areas capable of sensing a user's fingerprint or the like. If the entire display area DA is set as a sensing area, the non-display area NDA surrounding the display area DA may be a non-sensing area.

The light-sensing pixels PSR (or light sensors) may be arranged in the first area DA1 and the second area DA2. Each of the light-sensing pixels PSR may include a light receiving element including a light receiving layer. In the first area DA1 and the second area DA2, the light receiving layer of the light receiving element may be spaced apart from the light emitting layer of the light emitting element.

The light-sensing pixels PSR may detect light emitted from a light source (for example, a light emitting element) or reflected by an external object (for example, a user's finger or the like). For example, a user's fingerprint may be detected through each of the light-sensing pixels PSR. Hereinafter, the present disclosure mainly describes a case where the light-sensing pixels PSR are used to detect a fingerprint as an example, but it will be understood that the light-sensing pixels PSR according to the present disclosure may detect various biometric information such as an iris, a vein, or the like. In addition, the light-sensing pixels PSR may also detect external light, and may perform the function of a gesture sensor, a motion sensor, a proximity sensor, a light sensor, an image sensor, or the like.

The line portion LP, a pad portion PDP, and an embedded circuit portion for driving the sub-pixels PXL and the light-sensing pixels PSR may be disposed in the non-display area NDA. The non-display area NDA may include a fan-out area FTA and a pad area PDA.

The pad area PDA may be an area of the non-display area NDA where the pad portion PDP is arranged, and may be formed at an edge of the non-display area NDA.

The fan-out area FTA may be an area of the non-display area NDA where the line portion LP is arranged, and may be formed in an area between the display area DA and the non-display area NDA. For example, the fan-out area FTA may be an area of the non-display area NDA disposed between the pad area PDA and the display area DA. According to an embodiment, the non-display area NDA may include an electrostatic discharge protection circuit area in which an electrostatic discharge protection circuit electrically connected to signal lines of the display area DA to prevent the generation of electrostatic discharge is located.

The line portion LP may be disposed in the fan-out area FTA, and the pad portion PDP may be disposed in the pad area PDA.

The line portion LP may be electrically connected to the sub-pixels PXL and the light-sensing pixels PSR and transmit a predetermined signal received from a driving unit DIC to the signal lines. In the fan-out area FTA, the line portion LP may include fan-out lines that electrically connect the driving unit DIC to the sub-pixels PXL and the light-sensing pixels PSR.

In an embodiment, the line portion LP may include the first line LP1 and the second line LP2.

The first line LP1 may be arranged in an area of the fan-out area FTA between the first area DA1 and the pad portion PDP. The first line LP1 may be provided in a plurality and may include fan-out lines electrically connected to the light-sensing pixels PSR arranged in the first area DA1. For example, the first line LP1 may include fan-out lines electrically connected to readout lines associated with the light-sensing pixels PSR located in the first area DA1 and transmitting an electrical signal (for example, a sensing signal) received from the light-sensing pixels PSR to the driving unit DIC.

In an embodiment, the first line LP1 may include fan-out lines electrically connected to the readout lines associated with the light-sensing pixels PSR located in the second area DA2 via connection lines extending from the first area DA1 to the second area DA2.

The second line LP2 may be disposed in an area of the fan-out area FTA between the second area DA2 and the pad portion PDP. The second line LP2 may be provided in a plurality and may include fan-out lines electrically connected to the sub-pixels PXL located in the second area DA2. For example, the second line LP2 may include fan-out lines electrically connected to data lines associated with the sub-pixels PXL located in the second area DA2 and transmitting a data signal to the sub-pixels PXL.

In an embodiment, the second line LP2 may include fan-out lines electrically connected to data lines connected to the sub-pixels PXL located in the first area DA1 via bridge lines extending from the second area DA2 to the first area DA1.

The pad portion PDP may be disposed in the pad area PDA and may supply driving power sources and signals for driving the sub-pixels PXL and the light-sensing pixels PSR arranged in the display area DA. The pad portion PDP may be electrically connected to the line portion LP. In an embodiment, the pad portion PDP may include a first pad portion PDP1 and a second pad portion PDP2.

The first pad portion PDP1 may include a first pad P1 electrically connected to the first line LP1, and the second pad portion PDP2 may include a second pad P2 electrically connected to the second line LP2.

The first pad P1 may be provided in a plurality. The first pad P1 may include first pads P1 electrically connected to the readout lines associated with the light-sensing pixels PSR located in the first area DA1 through a corresponding first line LP1. In addition, the first pad P1 may include first pads P1 electrically connected to the connection lines associated with the light-sensing pixels PSR located in the second area DA2 through a corresponding first line LP1.

The second pad P2 may be provided in a plurality. The second pad P2 may include second pads P2 electrically connected to the data lines associated with the sub-pixels PXL located in the second area DA2 through a corresponding second line LP2. In addition, the second pad P2 may include second pads P2 electrically connected to the bridge lines associated with the sub-pixels PXL located in the first area DA1 through a corresponding second line LP2.

The display device DD may include a circuit board FPCB connected to the display panel DP through the pad portion PDP. The circuit board FPCB may be a flexible circuit board, but the present disclosure is not limited thereto.

The circuit board FPCB may process various signals input from a printed circuit board (not shown) and output them to the display panel DP. To this end, one end of the circuit board FPCB may be attached to the display panel DP, and the other end facing the one end may be attached to the printed circuit board. The circuit board FPCB may be connected to the display panel DP and the printed circuit board, respectively, by a conductive adhesive member (for example, an anisotropic conductive film).

The driving unit DIC may be mounted on the circuit board FPCB. The driving unit DIC may be, for example, an integrated circuit (IC). The driving unit DIC may include a panel driving unit and a fingerprint detection unit.

The panel driving unit may supply a data signal corresponding to an image data signal to the sub-pixels PXL while sequentially scanning the sub-pixels PXL. In this case, the display panel DP may display an image corresponding to image data. The panel driving unit may supply a driving signal to the sub-pixels PXL to cause the sub-pixels PXL to emit light. The light emitted from the sub-pixels PXL may be used as a light source to detect a fingerprint in the light-sensing pixels PSR. In an embodiment, the panel driving unit may supply a driving signal for detecting a fingerprint or another driving signal to the light-sensing pixels PSR. However, the present disclosure is not limited thereto, and driving signals for detecting a fingerprint may also be provided from the fingerprint detection unit.

The fingerprint detection unit may detect biometric information such as a user's fingerprint based on the sensing signal received from the light-sensing pixels PSR. The fingerprint detection unit may also supply driving signals to the light-sensing pixels PSR or the sub-pixels PXL.

In the display area DA, the first area DA1 may be arranged on both sides of the second area DA2. For example, the second area DA2 may be placed in the center of the substrate SUB (or the display device DD), and the first area DA1 may be placed at the edge of the substrate SUB. In other words, the second area DA2 may be located on the inner side of the display panel DP, and the first area DA1 may be located on the outer side of the display panel DP.

In the fan-out area FTA, the first line LP1 may be arranged on both sides of the second line LP2. For example, the second line LP2 may be placed in the center of the fan-out area FTA which is adjacent to the second area DA2, and the first line LP1 may be placed at the edge of the fan-out area FTA which is adjacent to the first area DA1. In other words, the second line LP2 may be located on the inner side of the fan-out area FTA, and the first line LP1 may be located on the outer side of the fan-out area FTA. As a result, the first line LP1 and the second line LP2 may be separated from each other in the fan-out area FAT.

In the pad area PDA, the first pad portion PDP1 may be located on both sides of the second pad portion PDP2. For example, the second pad portion PDP2 may be placed in the center of the pad area PDA to correspond to the second line LP2, and the first pad portion PDP1 may be placed at the edge of the pad area PDA to correspond to the first line LP1. In other words, the second pad portion PDP2 may be located on the inner side of the pad area PDA, and the first pad portion PDP1 may be located on the outer side of the pad area PDA.

Figure 3:
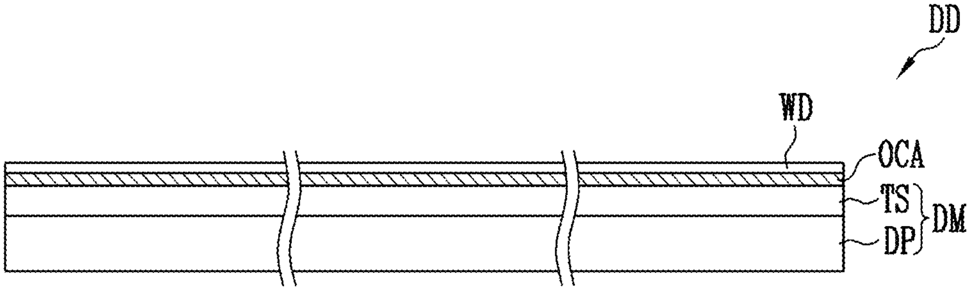
FIG. 3 is a cross-sectional view schematically illustrating the display device according to an embodiment.

FIG. 3 is a cross-sectional view schematically illustrating the display device DD according to an embodiment.

Referring to FIGS. 1 to 3, the display device DD may include a display module DM and a window WD.

The display module DM may include the display panel DP and a touch sensor TS.

The touch sensor TS may be disposed directly on the display panel DP, or may be disposed on the display panel DP with a separate layer, such as an adhesive layer or a substrate (or an insulating layer), interposed therebetween.

The display panel DP may display an image. The display panel DP may be self-emissive display panel, such as an organic light emitting display panel (OLED panel). The display panel DP may be a non-emissive display panel, such as a liquid crystal display panel (LCD panel), an electrophoretic display panel (EPD panel), or an electro-wetting display panel (EWD panel). When a non-emitting light type display panel is used as the display panel DP, the display device DD may include a backlight unit for supplying light to the display panel DP.

The touch sensor TS may be disposed on a surface of the display panel DP where the image is output to receive a user's touch input. The touch sensor TS may recognize a touch event of the display device DD through a user's hand or a separate input means. The touch sensor TS may recognize a touch event in a capacitive manner.

The touch sensor TS may detect a touch input in a mutual capacitance manner or a self-capacitance manner.

The window WD may be provided on the display module DM to protect the display module DM. The window WD may protect the display module DM from external impact. The window WD may be combined with the display module DM using an optically transparent adhesive OCA.

The window WD (or a cover glass) may have a multilayer structure selected from a group consisting of a glass substrate, a plastic film, and a plastic substrate. This multilayer structure may be formed through a continuous process or an adhesive process using an adhesive layer. The window WD may have flexibility in whole or in part.

Figure 4:
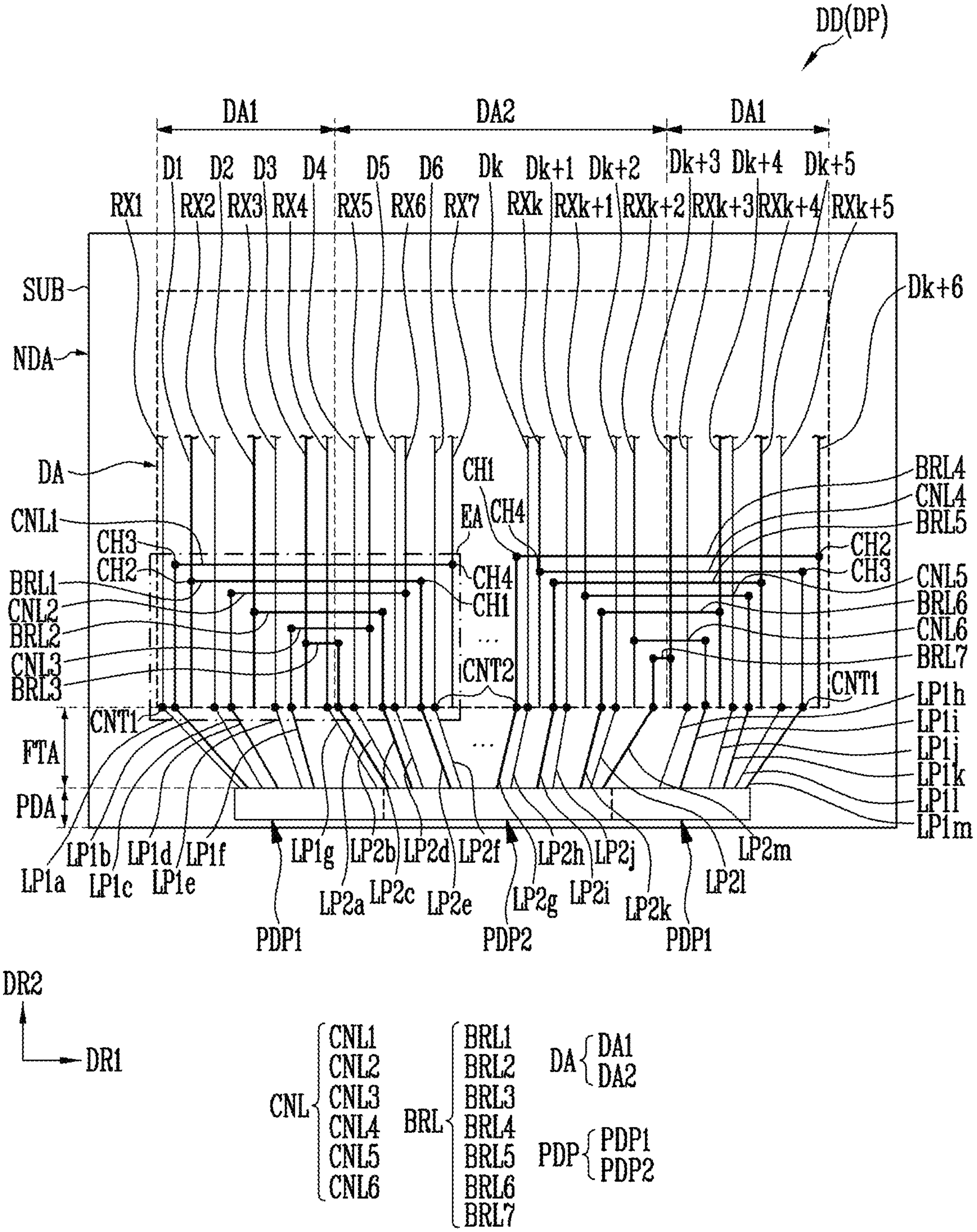
FIG. 4 is a plan view schematically illustrating data lines, readout lines, a bridge line, a connection line, first lines, and second lines in the display device of FIG. 1.

FIG. 4 is a plan view schematically illustrating data lines D1 to Dk+6, readout lines RX1 to RXk+5, a bridge line BRL, a connection line CNL, first lines LP1*a* to LP1*m*, and second lines LP2*a* to LP2*m* in the display device DD of FIG. 1.

Referring to FIGS. 1 to 4, the display device DD (or display panel DP) may include the substrate SUB, the line portion LP (see FIG. 1), and the pad portion PDP.

The pad portion PDP may be located in the pad area PDA and may include the first pad portion PDP1 and the second pad portion PDP2 that are electrically connected to the line portion LP. The first pad portion PDP1 may include the first pad P1 electrically connected to the first line LP1 (see FIG. 1), and the second pad portion PDP2 may include the second pad P2 electrically connected to the second line LP2 (see FIG. 1). The first pad portion PDP1 and the second pad portion PDP2 may be arranged to be physically and electrically separated from each other in the pad area PDA.

The line portion LP may be located in the fan-out area FTA and may include the first line LP1 electrically connected to the first pad portion PDP1 and the second line LP2 electrically connected to the second pad portion PDP2. The first line LP1 and the second line LP2 may be arranged to be physically and electrically separated from each other in the fan-out area FTA. For example, the first line LP1 may be arranged adjacent to the edge of the substrate SUB in the fan-out area FTA, and the second line LP2 may be arranged in the center of the fan-out area FTA. The first line LP1 may be disposed in the fan-out area FTA and extend toward the first area DA1, and the second line LP2 may be disposed in the fan-out area FTA and extend toward the second area DA2. The first line LP1 may be located on both sides of the second line LP2.

The first line LP1 may include a first set of first lines electrically connected to readout lines RX1 to RX4 and RXk+3 to RXk+5 located in the first area DA1 through a first contact portion CNT1. The first set of first lines may include a (1a)th line LP1*a*, a (1c)th line LP1*c*, a (1e)th line LP1*e*, a (1g)th line LP1*g*, a (1h)th line LP1*h*, a (1j)th line LP1*j*, and a (1l)th line LP1*l*.

In an embodiment, the first line LP1 may include a second set of first lines electrically connected to the connection line CNL extending from the first area DA1 to the second area DA2 through the first contact portion CNT1. The second set of first lines may include a (1b)th line LP1*b*, a (1d)th line LP1*d*, a (1f)th line LP1*f*, a (1i)th line LP1*i*, a (1k)th line LP1*k*, and a (1m)th line LP1*m*.

The second line LP2 may include a first set of second lines electrically connected to data lines D4 to Dk+2 located in the second area DA2 through a second contact portion CNT2. The first set of second lines may include a (2b)th line LP2*b*, a (2d)th line LP2*d*, a (2f)th line LP2*f*, a (2h)th line LP2*h*, a (2j)th line LP2*j*, and a (2l)th line PL2*l*.

In an embodiment, the second line LP2 may include a second set of second lines electrically connected to the bridge line BRL extending from the second area DA2 to the first area DA1 through the second contact portion CNT2. The second set of second lines may include a (2a)th line LP2*a*, a (2c)th line LP2*c*, a (2e)th line LP2*e*, a (2g)th line LP2*g*, a (2i)th line LP2*i*, a (2k)th line LP2*k*, and a (2m)th line LP2*m*.

In the following embodiments, when at least one of the (1a)th to (1m)th lines LP1*a* to LP1*m* is arbitrarily indicated, or when the (1a)th to (1m)th lines LP1*a* to LP1*m* are indicated collectively, it may be referred to as "first line LP1" or "first lines LP1". In addition, when at least one of the (2a)th to (2m)th lines LP2*a* to LP2*m* is arbitrarily indicated, or when the (2a)th to (2m)th lines LP2*a* to LP2*m* are indicated collectively, it may be referred to as "second line LP2" or "second lines LP2".

The substrate SUB may include the display area DA and the non-display area NDA. The display area DA may be divided into the first area DA1 and the second area DA2.

Signal lines through which various signals are applied may be arranged in the first area DA1 and the second area DA2. For example, the data lines D1 to Dk+6 through which data signal for controlling the luminance in each sub-pixel PXL is applied may be arranged in the first area DA1 and the second area DA2. The readout lines RX1 to RXk+5 through which the sensing signal from the light-sensing pixels PSR is received may be arranged in the first area DA1 and the second area DA2. In addition to the data lines D1 to Dk+6 and the readout lines RX1 to RXk+5, various signal lines such as power source lines and scan lines may be arranged in the first area DA1 and the second area DA2.

In the first area DA1 and the second area DA2, the sub-pixels PXL may be arranged or located in areas partitioned by scan lines and data lines (for example, D1 to Dk+6). In the first area DA1 and the second area DA2, the light-sensing pixels PSR may be arranged or located in areas partitioned by scan lines and readout lines (for example, RX1 to RXk+5).

A first data line D1, a second data line D2, a third data line D3, a (k+3)th data line Dk+3, a (k+4)th data line Dk+4, a (k+5)th data line Dk+5, and a (k+6)th data line Dk+6 may be arranged in the first area DA1. For convenience of description, FIG. 4 illustrates seven data lines arranged in the first area DA1, but the present disclosure is not limited thereto.

A fourth data line D4, a fifth data line D5, a sixth data line D6, a k-th data line Dk, a (k+1)th data line Dk+1, and a (k+2)th data line Dk+2 may be arranged in the second area DA2. For convenience of description, FIG. 4 illustrates six data lines arranged in the second area DA2, but the present disclosure is not limited thereto.

A first readout line RX1, a second readout line RX2, a third readout line RX3, a fourth readout line RX4, a (k+3)th readout line RXk+3, a (k+4)th readout line RXk+4, and a (k+5)th readout line RXk+5 may be arranged in the first area DA1. For convenience of description, FIG. 4 illustrates seven readout lines arranged in the first area DA1, but the present disclosure is not limited thereto.

A fifth readout line RX5, a sixth readout line RX6, a seventh readout line RX7, a k-th readout line RXk, a (k+1)th readout line RXk+1, and a (k+2)th readout line RXk+2 may be arranged in the second area DA2. For convenience of description, FIG. 4 illustrates six readout lines arranged in the second area DA2, but the present disclosure is not limited thereto.

The connection line CNL and the bridge line BRL may be disposed in the display area DA. In an embodiment, the connection line CNL and the bridge line BRL may be arranged not to overlap each other in the display area DA. In this case, coupling capacitance that may occur due to overlapping of the connection line CNL and the bridge line BRL can be prevented.

In an embodiment, the connection line CNL may extend from the first area DA1 to the second area DA2. For example, the connection line CNL may be routed from the edge (or outer side) of the display area DA to the center (or inner side) of the display area DA. The connection line CNL may be electrically connected to a corresponding first line LP1 through the first contact portion CNT1. The connection line CNL may include a vertical connection line disposed in the first area DA1 and extending along a second direction DR2, and a horizontal connection line electrically connected to the vertical connection line and extending from the first area DA1 to the second area DA2 along a first direction DR1 intersecting the second direction DR2.

The connection line CNL may include a first connection line CNL1, a second connection line CNL2, a third connection line CNL3, a fourth connection line CNL4, a fifth connection line CNL5, and a sixth connection line CNL6. Each of the first, second, third, fourth, fifth, and sixth connection lines CNL1, CNL2, CNL3, CNL4, CNL5, and CNL6 may include a vertical connection line disposed in the first area DA1 and extending in the second direction DR2, and a horizontal connection line extending from the first area DA1 to the second area DA2 in the first direction DR1.

The vertical connection line of the first connection line CNL1 may be electrically connected to the (1b)th line LP1*b* through the first contact portion CNT1 and may be electrically connected to the horizontal connection line of the first connection line CNL1 through a third contact hole CH3. The horizontal connection line may be electrically connected to the seventh readout line RX7 disposed in the second area DA2 through a fourth contact hole CH4. The first connection line CNL1 may electrically connect the seventh readout line RX7 to the (1b)th line LP1*b*. Accordingly, a sensing signal from a light-sensing pixel PSR of the second area DA2 received through the seventh readout line RX7 may be transmitted to the driving unit DIC through the first connection line CNL1 and the (1b)th line LP1*b*.

The vertical connection line of the second connection line CNL2 may be electrically connected to the (1d)th line LP1*d* through the first contact portion CNT1 and may be electrically connected to the horizontal connection line of the second connection line CNL2 through the third contact hole CH3. The horizontal connection line may be electrically connected to the sixth readout line RX6 disposed in the second area DA2 through the fourth contact hole CH4. The second connection line CNL2 may electrically connect the sixth readout line RX6 to the (1d)th line LP1*d*. Accordingly, a sensing signal from a light-sensing pixel PSR of the second area DA2 received through the sixth readout line RX6 may be transmitted to the driving unit DIC through the second connection line CNL2 and the (1d)th line LP1*d*.

The vertical connection line of the third connection line CNL3 may be electrically connected to the (1f)th line LP1*f* through the first contact portion CNT1 and may be electrically connected to the horizontal connection line of the third connection line CNL3 through the third contact hole CH3. The horizontal connection line may be electrically connected to the fifth readout line RX5 disposed in the second area DA2 through the fourth contact hole CH4. The third connection line CNL3 may electrically connect the fifth readout line RX5 to the (1f)th line LP1*f*. Accordingly, a sensing signal from a light-sensing pixel PSR of the second area DA2 received through the fifth readout line RX5 may be transmitted to the driving unit DIC through the third connection line CNL3 and the (1f)th line LP1*f*.

The vertical connection line of the fourth connection line CNL4 may be electrically connected to the (1m)th line LP1*m* through the first contact portion CNT1 and may be electrically connected to the horizontal connection line of the fourth connection line CNL4 through the third contact hole CH3. The horizontal connection line may be electrically connected to the k-th readout line RXk disposed in the second area DA2 through the fourth contact hole CH4. The fourth connection line CNL4 may electrically connect the k-th readout line RXk to the (1m)th line LP1*m*. Accordingly, a sensing signal from a light-sensing pixel PSR of the second area DA2 received through the k-th readout line RXk may be transmitted to the driving unit DIC through the fourth connection line CNL4 and the (1m)th line LP1*m*.

The vertical connection line of the fifth connection line CNL5 may be electrically connected to the (1k)th line LP1*k* through the first contact portion CNT1 and may be electrically connected to the horizontal connection line of the fifth connection line CNL5 through the third contact hole CH3. The horizontal connection line may be electrically connected to the (k+1)th readout line RXk+1 disposed in the second area DA2 through the fourth contact hole CH4. The fifth connection line CNL5 may electrically connect the (k+1)th readout line RXk+1 to the (1k)th line LP1*k*. Accordingly, a sensing signal from a light-sensing pixel PSR of the second area DA2 received through the (k+1)th readout line RXk+1 may be transmitted to the driving unit DIC through the fifth connection line CNL5 and the (1k)th line LP1*k*.

The vertical connection line of the sixth connection line CNL6 may be electrically connected to the (1i)th line LP1*i* through a first contact hole CNT1 and may be electrically connected to the horizontal connection line of the sixth connection line CNL6 through the third contact hole CH3. The horizontal connection line may be electrically connected to the (k+2)th readout line RXk+2 disposed in the second area DA2 through the fourth contact hole CH4. The sixth connection line CNL6 may electrically connect the (k+2)th readout line RXk+2 to the (1i)th line LP1*i*. Accordingly, a sensing signal from a light-sensing pixel PSR of the second area DA2 received through the (k+2)th readout line RXk+2 may be transmitted to the driving unit DIC through the sixth connection line CNL6 and the (1i)th line LP1*i*.

One end of the vertical connection line may be electrically connected to a corresponding first line LP1 through the first contact portion CNT1, and the other end of the vertical connection line may be electrically connected to a corresponding horizontal connection line through the third contact hole CH3. One end of the horizontal connection line may be electrically connected to the vertical connection line through the third contact hole CH3, and the other end of the horizontal connection line may be electrically connected to a corresponding readout line located in the second area DA2 through the fourth contact hole CH4.

In an embodiment, the bridge line BRL may extend from the second area DA2 to the first area DA1. For example, the bridge line BRL may be routed from the center (or inner side) of the display area DA to the edge (or outer side) of the display area DA. The bridge line BRL may be electrically connected to a corresponding second line LP2 through the second contact portion CNT2. The bridge line BRL may include a vertical bridge line disposed in the second area DA2 and extending along the second direction DR2, and a horizontal bridge line electrically connected to the vertical bridge line and extending from the second area DA2 to the first area DA1 from the second area DA2 along the first direction DR1 intersecting the second direction DR2.

The bridge line BRL may include a first bridge line BRL1, a second bridge line BRL2, a third bridge line BRL3, a fourth bridge line BRL4, a fifth bridge line BRL5, a sixth bridge line BRL6, and a seventh bridge line BRL7. Each of the first, second, third, fourth, fifth, sixth, and seventh bridge lines BRL1, BRL2, BRL3, BRL4, BRL5, BRL6, and BRL7 may include a vertical bridge line located in the second area DA2 and extending in the second direction DR2, and a horizontal bridge line extending from the second area DA2 to the first area DA1 in the first direction DR1.

The vertical bridge line of the first bridge line BRL1 may be electrically connected to the (2e)th line LP2*e* through the second contact portion CNT2 and may be electrically connected to the horizontal bridge line of the first bridge line BRL1 through the first contact hole CH1. The horizontal bridge line may be electrically connected to the first data line D1 disposed in the first area DA1 through a second contact hole CH2. The first bridge line BRL1 may electrically connect the first data line D1 to the (2e)th line LP2*e*. Accordingly, a data signal transmitted from the driving unit DIC to the (2e)th line LP2*e* may be transmitted to the first data line D1 via the first bridge line BRL1.

The vertical bridge line of the second bridge line BRL2 may be electrically connected to the (2c)th line LP2*c* through the second contact portion CNT2 and may be electrically connected to the horizontal bridge line of the second bridge line BRL2 through the first contact hole CH1. The horizontal bridge line may be electrically connected to the second data line D2 disposed in the first area DA1 through the second contact hole CH2. The second bridge line BRL2 may electrically connect the second data line D2 to the (2c)th line LP2*c*. Accordingly, a data signal transmitted from the driving unit DIC to the (2c)th line LP2*c* may be transmitted to the second data line D2 via the second bridge line BRL2.

The vertical bridge line of the third bridge line BRL3 may be electrically connected to the (2a)th line LP2*a* through the second contact portion CNT2 and may be electrically connected to the horizontal bridge line of the third bridge line BRL3 through the first contact hole CH1. The horizontal bridge line may be electrically connected to the third data line D3 disposed in the first area DA1 through the second contact hole CH2. The third bridge line BRL3 may electrically connect the third data line D3 to the (2a)th line LP2*a*. Accordingly, a data signal transmitted from the driving unit DIC to the (2a)th line LP2*a* may be transmitted to the third data line D3 via the third bridge line BRL3.

The vertical bridge line of the fourth bridge line BRL4 may be electrically connected to the (2g)th line LP2*g* through the second contact portion CNT2 and may be electrically connected to the horizontal bridge line of the fourth bridge line BRL4 through the first contact hole CH1. The horizontal bridge line may be electrically connected to the (k+6)th data line Dk+6 disposed in the first area DA1 through the second contact hole CH2. The fourth bridge line BRL4 may electrically connect the (k+6)th data line Dk+6 to the (2g)th line LP2*g*. Accordingly, a data signal transmitted from the driving unit DIC to the (2g)th line LP2*g* may be transmitted to the (k+6)th data line Dk+6 via the fourth bridge line BRL4.

The vertical bridge line of the fifth bridge line BRL5 may be electrically connected to the (2i)th line LP2*i* through the second contact portion CNT2 and may be electrically connected to the horizontal bridge line of the fifth bridge line BRP5 through the first contact hole CH1. The horizontal bridge line may be electrically connected to the (k+5)th data line Dk+5 disposed in the first area DA1 through the second contact hole CH2. The fifth bridge line BRL5 may electrically connect the (k+5)th data line Dk+5 to the (2i)th line LP2*i*. Accordingly, a data signal transmitted from the driving unit DIC to the (2i)th line LP2*i* may be transmitted to the (k+5)th data line Dk+5 via the fifth bridge line BRL5.

The vertical bridge line of the sixth bridge line BRL6 may be electrically connected to the (2k)th line LP2*k* through the second contact portion CNT2 and may be electrically connected to the horizontal bridge line of the sixth bridge line BRL6 through the first contact hole CH1. The horizontal bridge line may be electrically connected to the (k+4)th data line Dk+4 disposed in the first area DA1 through the second contact hole CH2. The sixth bridge line BRL6 may electrically connect the (k+4)th data line Dk+4 to the (2k)th line LP2*k*. Accordingly, a data signal transmitted from the driving unit DIC to the (2k) th line LP2*k* may be transmitted to the (k+4)th data line Dk+4 via the sixth bridge line BRL6.

The vertical bridge line of the seventh bridge line BRL7 may be electrically connected to the (2m)th line LP2*m* through the second contact portion CNT2 and may be electrically connected to the horizontal bridge line of the seventh bridge line BRL7 through the first contact hole CH1. The horizontal bridge line may be electrically connected to the (k+3)th data line Dk+3 disposed in the first area DA1 through the second contact hole CH2. The seventh bridge line BRL7 may electrically connect the (k+3)th data line Dk+3 to the (2m)th line LP2*m*. Accordingly, a data signal transmitted from the driving unit DIC to the (2m)th line LP2*m* may be transmitted to the (k+3)th data line Dk+3 via the seventh bridge line BRL7.

According to the above-described embodiment, the first pad portion PDP1 (or the first pad P1) electrically connected to the readout line and the second pad portion PDP2 (or the second pad P2) electrically connected to the data line may be separated from each other in the pad area PDA, and may be concentratedly disposed in a specific area of the pad area PDA, respectively. For example, the second pad portion PDP2 may be located in the center of the pad area PDA to correspond to the second area DA2 of the display area DA, and the first pad portion PDP1 may be located at both edges of the pad area PDA to correspond to the first area DA1 of the display area DA. In this case, a phenomenon in which the sensing signal of the light-sensing pixel PSR transmitted to the driving unit DIC through the first pad portion PDP1 is affected by the data signal transmitted to the data line through the second pad portion PDP2 can be reduced or prevented. In addition, a phenomenon in which the data signal transmitted to the data line through the second pad portion PDP2 is affected by the sensing signal of the light-sensing pixel PSR transmitted to the driving unit DIC through the first pad portion PDP1 can be reduced or prevented. If a readout pad electrically connected to the readout line and a data pad electrically connected to the data line are arranged alternately in the pad area PDA, coupling capacitance (or parasitic capacitance) may occur between the readout pad and the data pad. Accordingly, in the above-described embodiment, the first pad portion PDP1 and the second pad portion PDP2 may be arranged to be separated, and each of them may be located only in a specific area in the pad area PDA, thereby preventing the coupling capacitance described above and improving the reliability of the display device DD.

According to the above-described embodiment, the first line LP1 electrically connected to the readout line and the second line LP2 electrically connected to the data line may be separated from each other in the fan-out area FTA, and may be concentratedly disposed in a specific area of the fan-out area FTA, respectively. For example, the second line LP2 may be located in the center of the fan-out area FTA to correspond to the second area DA2 of the display area DA, and the first line LP1 may be located at both edges of the fan-out area FTA to correspond to the first area DA1 of the display area DA. In this case, a phenomenon in which the sensing signal of the light-sensing pixel PSR transmitted to the first pad portion PDP1 through the first line LP1 is affected by the data signal transmitted to the data line through the second line LP2 can be reduced or prevented. In addition, a phenomenon in which the data signal transmitted to the data line through the second line LP2 is affected by the sensing signal of the light-sensing pixel PSR transmitted to the first pad portion PDP1 through the first line LP1 can be reduced or prevented. If a readout fan-out line electrically connected to the readout line and a data fan-out line electrically connected to the data line are arranged alternately in the fan-out area FTA, coupling capacitance (or parasitic capacitance) may occur between the readout fan-out line and the data fan-out line. Accordingly, in the above-described embodiment, the first line LP1 and the second line LP2 may be arranged to be separated, and each of them may be located only in a specific area in the fan-out area FTA, thereby preventing the coupling capacitance described above and improving the reliability of the display device DD.

Figure 5:
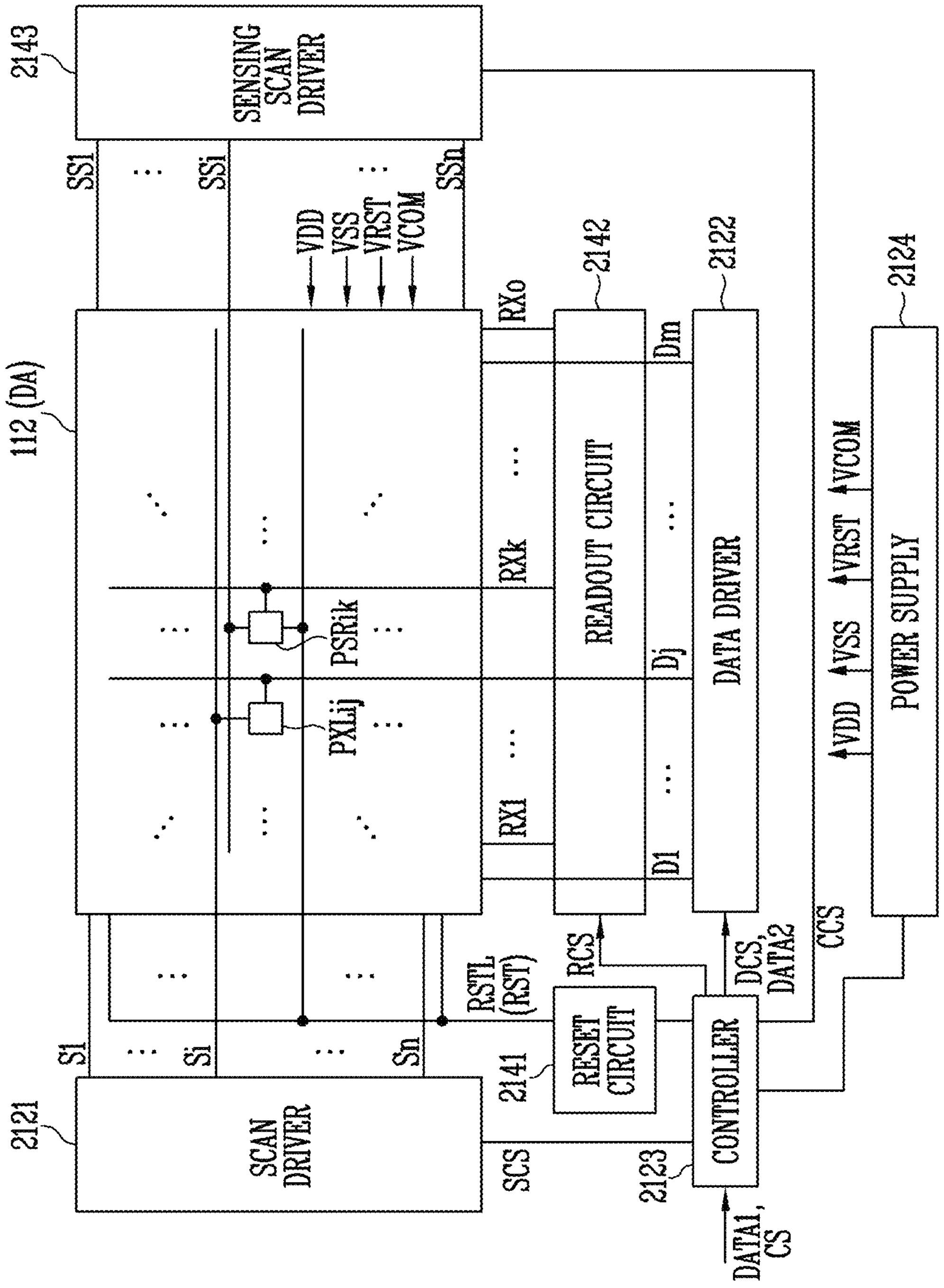
FIG. 5 is a block diagram illustrating the display device according to an embodiment.
Figure 6:
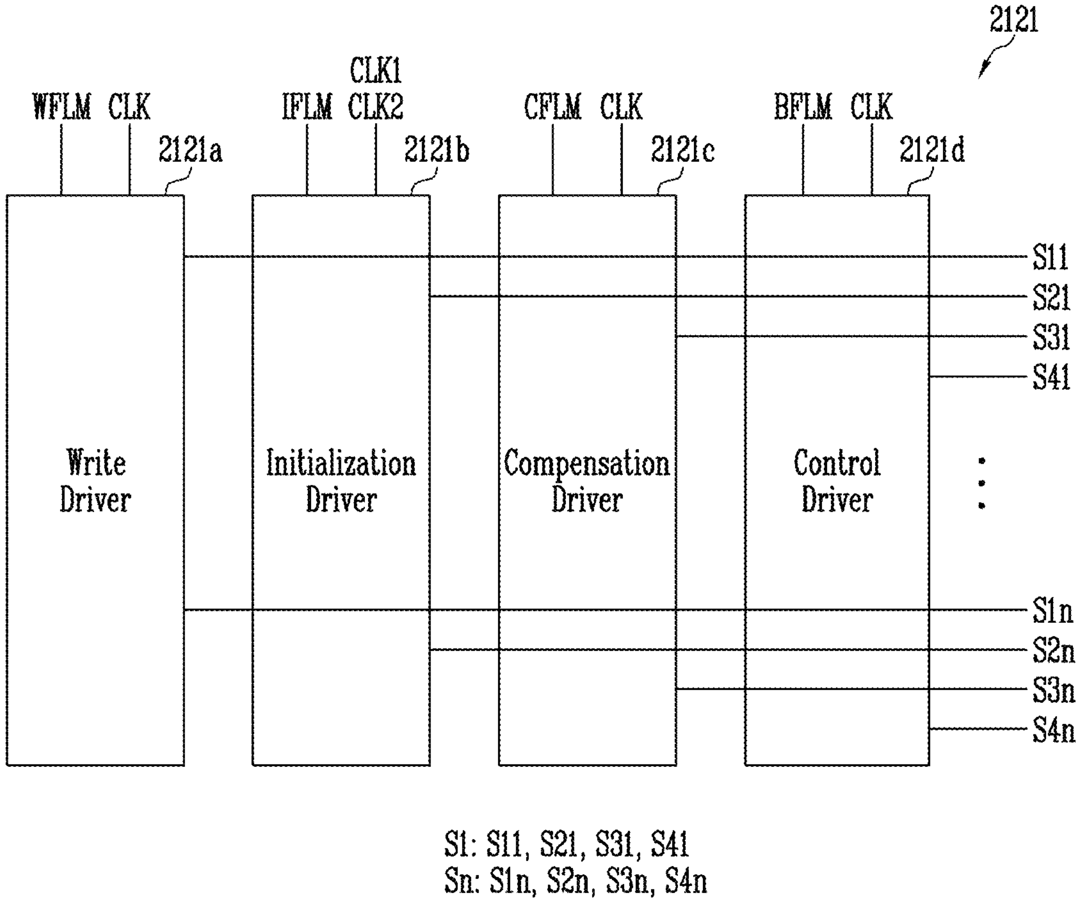
FIG. 6 is a diagram illustrating a scan driver shown in FIG. 5.

FIG. 5 is a block diagram illustrating the display device according to an embodiment of the present invention. FIG. 6 is a diagram illustrating a scan driver shown in FIG. 5. Here, “i”, “j”, “k”, “m”, and “o” included in FIG. 5 may be different from “i”, “j”, “k”, “m”, and “o” included in FIG. 4. For example, “i”, “j”, “k”, “m”, and “o” included in FIG. 4 may be for distinguishing lines, and “i”, “j”, “k”, “m”, and “o” included in FIG. 5 may mean specific numbers.

Referring to FIG. 5, the display unit 112 may include signal lines, the sub-pixels PXL, and the light-sensing pixels PSR. The signal lines may include scan lines S1, . . . , Si, . . . , and Sn, data lines D1, . . . , Dj, . . . , and Dm, readout lines RX1, . . . , RXk, . . . , and RXo, sensing scan lines SS1, . . . , SSi, . . . , and SSn, and a reset control line RSTL (or reset line). Here, n, m, and o may be natural numbers greater than or equal to 3. Here, i, j, and k may be natural numbers greater than or equal to 1 and less than or equal to n, m, and o, respectively.

The sub-pixels PXL may be arranged or located in areas (for example, pixel areas) partitioned by the scan lines S1 to Sn and the data lines D1 to Dm. The light-sensing pixels PXL may be arranged or located in areas partitioned by the sensing scan lines SS1 to SSn and the readout lines RX1 to RXo. The sub-pixels PXL and the light-sensing pixels PSR may be arranged in a two-dimensional array in the display area DA, but the present invention is not limited thereto.

Each of the sub-pixels PXL may be electrically connected to at least one of the scan lines S1 to Sn and one of the data lines D1 to Dm. Each of the light-sensing pixels PSR may be electrically connected to one of the sensing scan lines SS1 to SSn, one of the readout lines RX1 to RXo, and the reset control line RSTL.

A driving unit D-IC may include at least one of a scan driver 2121, a data driver 2122, a controller 2123 (or timing controller), a power supply 2124, a reset circuit 2141, a readout circuit 2142, and a sensing scan driver 2143.

For example, the scan driver 2121, the data driver 2122, the controller 2123, and the power supply 2124 may be included in a panel driver, and the reset circuit 2141, the readout circuit 2142, and the sensing scan driver 2143 may be included in a fingerprint detector. However, the present invention is not limited thereto.

The scan driver 2121 may be electrically connected to the sub-pixels PXL through the scan lines S1 to Sn. The scan driver 2121 may generate scan signals based on a scan control signal SCS (or gate control signal) and provide the scan signals to the scan lines S1 to Sn. Here, the scan control signal SCS may include a start signal, clock signals, and the like, and may be provided to the scan driver 2121 from the controller 2123.

Figure 7:
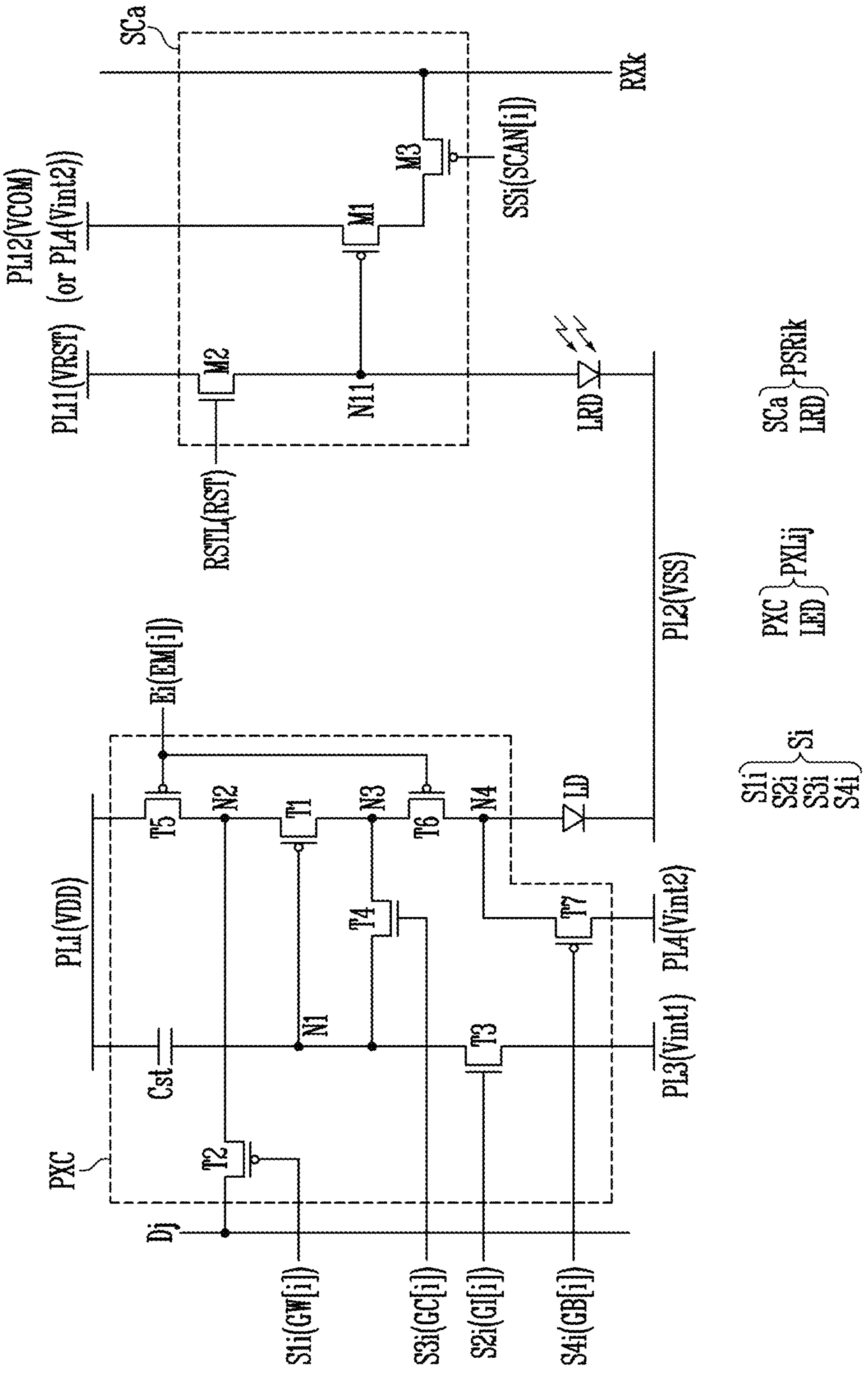
FIG. 7 is a circuit diagram illustrating a sub-pixel and a light-sensing pixel shown in FIG. 5.

The scan driver 2121 may have a plurality of drivers 2121*a*, 2121*b*, 2121*c*, and 2121*d* as shown in FIG. 6. Each of the scan lines S1 to Sn may have a plurality of scan lines. For example, a first scan line S1 may include a first first scan line S11, a first second scan line S21, a first third scan line S31, and a first fourth scan line S41. For example, an n-th scan line Sn may include an n-th first scan line S1*n*, an n-th second scan line S2*n*, an n-th third scan line S3*n*, and an n-th fourth scan line S4*n*. For example, as shown in FIG. 7, an i-th scan line Si may include an i-th first scan line S1*i*, an i-th second scan line S2*i*, an i-th third scan line S3*i*, and an i-th fourth scan line S4*i*.

A write driver 2121*a* may sequentially supply a first scan signal GW to first scan lines S11 to S1*n*. For example, the write driver 2121*a* may receive a write start signal WFLM and generate the first scan signal GW by shifting the write start signal WFLM in response to a clock signal CLK. The first scan signal GW may be set to a gate-on voltage, and accordingly, a transistor receiving the first scan signal GW may be turned on.

A compensation driver 2121*c* may sequentially supply a third scan signal GC to third scan lines S31 to S3*n*. For example, the compensation driver 2121*c* may receive a compensation start signal CFLM and generate the third scan signal GC by shifting the compensation start signal CFLM in response to the clock signal CLK. The third scan signal GC may be set to a gate-on voltage, and accordingly, a transistor receiving the third scan signal GC may be turned on.

A control driver 2121*d* may sequentially supply a fourth scan signal GB to fourth scan lines S41 to S4*n*. For example, the control driver 2121*d* may receive a control start signal BFLM and generate the fourth scan signal GB by shifting the control start signal BFLM in response to the clock signal CLK. The fourth scan signal GB may be set to a gate-on voltage, and accordingly, a transistor receiving the fourth scan signal GB may be turned on.

In an embodiment, the write driver 2121*a*, the compensation driver 2121*c*, and the control driver 2121*d* may be formed as separate components. In an embodiment, at least two of the write driver 2121*a*, the compensation driver 2121*c*, and the control driver 2121*d* may be integrated and formed as one component. In an embodiment, the clock signal CLK may be composed of a plurality of signals, and different signals may be supplied to the write driver 2121*a*, the compensation driver 2121*c*, and the control driver 2121*d*. In an embodiment, the clock signal CLK may include a plurality of signals, and at least two of the write driver 2121*a*, the compensation driver 2121*c*, and the control driver 2121*d* may share the signals.

An initialization driver 2121*b* may sequentially supply a second scan signal GI to second scan lines S21 to S2*n*. For example, the initialization driver 2121*b* may receive an initialization start signal IFLM and generate the second scan signal GI by shifting the initialization start signal IFLM in response to clock signals CLK1 and CLK2. The second scan signal GI may be set to a gate-on voltage, and accordingly, a transistor receiving the second scan signal GI may be turned on.

Additionally, the clock signals CLK1 and CLK2 supplied to the initialization driver 2121*b* may be set in various ways depending on the configuration of a stage circuit included in the initialization driver 2121*b*. For example, the initialization driver 2121*b* may be driven in response to at least one clock signal.

A sub-pixel selected and driven by the scan driver 2121 may emit light with a luminance corresponding to a data signal provided through a data line. For example, a sub-pixel PXLij selected and driven by an i-th scan line Si may emit light with a luminance corresponding to a data signal provided through a j-th data line Dj.

The data driver 2122 may generate a data signal (or data voltage) based on image data DATA2 and a data control signal DCS provided from the controller 2123, and provide the data signal to the display unit 112 (or sub-pixels PXL) through the data lines D1 to Dm. Here, the data control signal DCS may be a signal that controls the operation of the data driver 2122 and may include a data enable signal (or load signal) that instructs the output of a valid data signal, a horizontal start signal, a data clock signal, and the like.

The controller 2123 may receive input image data DATA1 and a control signal CS from an external device (for example, a graphics processor or an application processor), generate the scan control signal SCS and the data control signal DCS based on the control signal CS, and convert the input image data DATA1 to generate the image data DATA2. The control signal CS may include a vertical synchronization signal, a horizontal synchronization signal, a reference clock signal, and the like. The vertical synchronization signal may indicate the start of frame data (that is, data corresponding to a frame section in which one frame image is displayed), and the horizontal synchronization signal may indicate the start of a data row (that is, one of a plurality of data rows included in the frame data). The controller 2123 may convert the input image data DATA1 into the image data DATA2 having a format that matches the arrangement of sub-pixels in the display unit 112. In addition, the controller 2123 may generate a reset control signal, a readout control signal RCS, and a sensing control signal CCS based on the control signal CS.

The readout circuit 2142 may receive (or detect) the sensing signal from the light-sensing pixels PSR during a plurality of frame periods. The controller 2123 may supply a start signal to the scan driver 2121 at a first time point after a frame starts during some of the plurality of frame periods in which the sensing signal is detected, and may supply a start signal to the scan driver 2121 at a second time point after a frame starts during the remaining frame periods among the plurality of frame periods. Here, the first time point may be different from the second time point.

In an embodiment, the second time point may be a time point shifted by one horizontal period compared to the first time point. In this case, the scan signal supplied during the remaining frame periods may have a different supply timing from the scan signal supplied during the some frame periods.

In an embodiment, the start signal, whose supply timing is controlled by the controller 2123 during the plurality of frame periods in which the sensing signal is detected, may be the initialization start signal IFLM. The initialization driver 2121*b* may supply the second scan signal GI at different timings during the remaining frame periods and the some frame periods in response to the initialization start signal IFLM.

The power supply 2124 may provide power source voltages VDD, VSS, VRST, and VCOM required to drive the sub-pixels PXL and the light-sensing pixels PSR. FIG. 5 shows several types of power source voltages VDD, VSS, VRST, and VCOM generated by the power supply 2124, and the power supply 2124 may further generate various power source voltages corresponding to the structures of the sub-pixels PXL and the light-sensing pixels PSR.

A first power source voltage VDD may be a power source for supplying driving current to the sub-pixels PXL. A second power source voltage VSS may be a power source for receiving driving current from the sub-pixels PXL. During a period in which the sub-pixels PXL are set to a light-emitting state, the first power source voltage VDD may be set to a voltage higher than the second power source voltage VSS. A reset voltage VRST may be a voltage for initializing the light-sensing pixels PSR. A common voltage VCOM may be a voltage supplied to the light-sensing pixels PSR.

The reset circuit 2141 may be commonly connected to all light-sensing pixels PSR provided in the display unit 112 through one reset control line RSTL. The reset circuit 2141 may simultaneously provide a reset signal RST (or reset control signal) to the light-sensing pixels PSR in response to the reset control signal RSTL. Here, the reset signal RST may be a control signal for providing the reset voltage VRST to the light-sensing pixels PSR. Since the reset signal RST is provided simultaneously to the light-sensing pixels PSR, the reset signal RST may be referred to as a global reset signal.

The readout circuit 2142 may receive the sensing signal from the light-sensing pixel PSR through the readout lines RX1 to RXo and perform signal processing on the sensing signal. For example, the readout circuit 2142 may perform a correlated double sampling (CDS) operation to remove noise from the sensing signal provided from the light-sensing pixel PSR.

The sensing scan driver 2143 may be electrically connected to the light-sensing pixels PSR through the sensing scan lines SS1, . . . , SSi, . . . , and SSn. The sensing scan driver 2143 may generate sensing scan signals SCAN based on the sensing control signal CCS and provide the sensing scan signals SCAN to the sensing scan lines SS1 to SSn. That is, the sensing scan driver 2143 may select the light-sensing pixels PSR while scanning the display unit 112. The sensing scan driver 2143 may be formed on the display unit 112 together with the light-sensing pixels PSR.

However, the sensing scan driver 2143 is not limited thereto. For example, the sensing scan driver 2143 may be implemented as an integrated circuit. Additionally, the sensing scan lines SS1 to SSn may be replaced with the scan lines S1 to Sn. For example, the sensing scan lines SS1 to SSn may be replaced with the first scan lines S11 to S1*n*. In this case, the sensing scan driver 2143 may be omitted.

A light-sensing pixel selected and driven by the sensing scan driver 2143 may output an electrical signal (that, a sensing signal, for example, as a current or a voltage) corresponding to the detected light to the readout line. For example, a light-sensing pixel PSRik selected and driven by an i-th sensing scan line SSi may output an electrical signal corresponding to the detected light to the k-th readout line RXk, where k may be a natural number.

The readout circuit 2142 may convert an analog sensing signal into a digital signal (or a digital value). The readout sensing signal (or digital sensing signal) may be provided to an external device as one sensing data. In an embodiment, biometric authentication (for example, fingerprint authentication) may be performed based on the sensing data.

FIG. 7 is a circuit diagram illustrating an embodiment of a sub-pixel and a light-sensing pixel shown in FIG. 5. For convenience of description, FIG. 7 shows a sub-pixel PXLij located on an i-th horizontal line (or i-th sub-pixel row) and connected to a j-th data line Dj. For convenience of description, FIG. 7 shows a light-sensing pixel PSRik located on the i-th horizontal line (or i-th sub-pixel row) and connected to a k-th readout line RXk. The i-th scan lines S1*i* to S4*i* may be included in the i-th scan line Si show in FIG. 5.

Referring to FIG. 7, the sub-pixel PXLij and the light-sensing pixel PSRik may be disposed in the i-th horizontal line. The sub-pixel PXLij may include a light emitting element LD and a pixel circuit PXC. In an embodiment, the pixel circuit PXC may include first, second, third, fourth, fifth, sixth, and seventh transistors T1, T2, T3, T4, T5, T6, and T7 and a storage capacitor Cst.

The first transistor T1 (or a driving transistor) may be connected between a first power source line PL1 and a first electrode of the light emitting element LD. The first transistor T1 may include a gate electrode connected to a first node N1. The first transistor T1 may control the amount of current (or driving current) flowing from the first power source line PL1 to a second power source line PL2 via the light emitting element LD in response to a voltage of the first node N1. The first power source voltage VDD may be provided to the first power source line PL1, the second power source voltage VSS may be provided to the second power source line PL2, and the first power source voltage VDD may be set to a voltage higher than the second power source voltage VSS.

The second transistor T2 may be connected between the j-th data line Dj and a second node N2. A gate electrode of the second transistor T2 may be connected to a (1i)th scan line S1*i* (or a first scan line). The second transistor T2 may be turned on when a first scan signal GW[i] (for example, the first scan signal of a low level) is supplied to the (1i)th scan line S1*i* to electrically connect the j-th data line Dj and the second node N2. When each of the first transistor T1 and the fourth transistor T4 is turned on, the second transistor T2 may transmit a data signal of the j-th data line Dj to the first node N1 in response to the first scan signal GW[i].

The third transistor T3 may be connected between the first node N1 and a third power source line PL3. A gate electrode of the third transistor T3 may be connected to a (2i)th scan line S2*i* (or a second scan line). A first initialization power source voltage Vint1 may be provided to the third power source line PL3. The third transistor T3 may be turned on by a second scan signal GI[i] supplied to the (2i)th scan line S2*i*. When the third transistor T3 is turned on, the first initialization power source voltage Vint1 may be supplied to the first node N1 (that is, the gate electrode of the first transistor T1).

The fourth transistor T4 may be connected between the first node N1 and a third node N3. A gate electrode of the fourth transistor T4 may be connected to a (3i)th scan line S3*i* (or a third scan line). The fourth transistor T4 may be turned on when a third scan signal GC[i] is supplied to the (3i)th scan line S3*i*. When the fourth transistor T4 is turned on, the first transistor T1 may be connected in the form of a diode.

The fifth transistor T5 may be connected between the first power source line PL1 and the second node N2. A gate electrode of the fifth transistor T5 may be connected to an i-th emission control line Ei. The sixth transistor T6 may be connected between the third node N3 and the first electrode (or an anode electrode) of the light emitting element LD (or a fourth node N4). A gate electrode of the sixth transistor T6 may be connected to the i-th emission control line Ei. The fifth transistor T5 and the sixth transistor T6 may be turned off when an emission control signal EM[i] (for example, the emission control signal EM[i] of a high level) is supplied to the i-th emission control line Ei, and may be turned on in other cases.

The emission control signal EM[i] may be supplied by an emission driver (not shown). The emission control signal EM[i] may be set to a gate-off voltage, and accordingly, a transistor receiving the emission control signal EM[i] may be turned off.

The seventh transistor T7 may be connected between the first electrode of the light emitting element LD (that is, the fourth node N4) and a fourth power source line PL4. A gate electrode of the seventh transistor T7 may be connected to a (4i)th scan line S4*i* (or a fourth scan line). A second initialization power source voltage Vint2 may be provided to the fourth power source line PL4. According to an embodiment, the second initialization power source voltage Vint2 may be the same as or different from the first initialization power source voltage Vint1. The seventh transistor T7 may be turned on by a fourth scan signal GB[i] supplied to the (4i)th scan line S4*i* to supply the second initialization power source voltage Vint2 to the first electrode of the light emitting element LD.

The storage capacitor Cst may be connected or formed between the first power source line PL1 and the first node N1.

The light-sensing pixel PSRik may include a sensor circuit SCa and a light receiving element LRD. The sensor circuit SCa may include first, second, and third transistors M1, M2, and M3. The first and third transistors M1 and M3 may be connected in series between a second power source line PL12 and the k-th readout line RXk.

The first transistor M1 (or a first sensor transistor) may be connected between the second power source line PL12 (or a fifth power source line) and the third transistor M3. A gate electrode of the first transistor M1 may be connected to a first node N11 (or a sensor node). The first transistor M1 may control the current flowing from the second power source line PL12 to the k-th readout line RXk through the third transistor M3 in response to a voltage of the first node N11. The common voltage VCOM may be provided to the second power source line PL12.

In an embodiment, the second power source line PL12 may be electrically connected to or formed integrally with the fourth power source line PL4, and the common voltage VCOM applied to the second power source line PL12 may be equal to the second initialization power source voltage Vint2. However, the present disclosure is not limited thereto. For example, the second power source line PL12 may be electrically connected to or formed integrally with the third power source line PL3, and the common voltage VCOM applied to the second power source line PL12 may be equal to the first initialization power source voltage Vint1.

The third transistor M3 (a third sensor transistor or a switching transistor) may be connected between the first transistor M1 and the k-th readout line RXk. A gate electrode of the third transistor M3 may be connected to a sensing scan line SSi. Here, the sensing scan line SSi may be electrically connected to or formed integrally with the (1i)th scan line S1*i*.

The second transistor M2 (or a second sensor transistor) may be connected between a first power source line PL11 (or a sixth power source line) and the first node N11. A gate electrode of the second transistor M2 may be connected to the reset control line RSTL. The reset voltage VRST may be provided to the first power source line PL11.

At least one light receiving element LRD may be connected between the first node N11 and the second power source line PL2 to which the second power source voltage VSS is provided. The light receiving element LRD may generate a charge (or current) based on incident light. That is, the light receiving element LRD may perform a photoelectric conversion function. For example, the light receiving element LRD may be implemented as a photodiode.

When the second transistor M2 is turned on by the reset signal RST supplied to the reset control line RSTL, the reset voltage VRST may be provided to the first node N11. For example, the voltage of the first node N11 may be reset by the reset voltage VRST. After the reset voltage VRST is applied to the first node N11, the light receiving element LRD may perform the photoelectric conversion function.

The voltage of the first node N11 may change due to the operation of the light receiving element LRD. The voltage of the first node N11 (or charge or current generated in the light receiving element LRD) may change depending on the intensity of light incident on the light receiving element LRD and the time for which the light is incident (or the time for which the light receiving element LRD is exposed to light).

When the third transistor M3 is turned on by a sensing scan signal SCAN[i] supplied to the sensing scan line SSi, a sensing signal (current and/or voltage) generated based on the voltage of the first node N11 may flow to the k-th readout line RXk.

In an embodiment, each of the pixel circuit PXC and the sensor circuit SCa may include a P-type transistor and an N-type transistor. In an embodiment, the third transistor T3, the fourth transistor T4 of the pixel circuit PXC, and the second transistor M2 of the sensor circuit SCa may be formed as oxide semiconductor transistors including oxide semiconductors. For example, the third transistor T3, the fourth transistor T4 of the pixel circuit PXC, and the second transistor M2 of the sensor circuit SCa may be N-type oxide semiconductor transistors and may include an oxide semiconductor layer as an active layer.

The oxide semiconductor transistors may be manufactured by low-temperature processes and may have lower charge mobility than polysilicon semiconductor transistors. That is, the oxide semiconductor transistors may have excellent off-current characteristics. Accordingly, leakage current in the third transistor T3, the fourth transistor T4 of the pixel circuit PXC, and the second transistor M2 of the sensor circuit SCa can be minimized.

The remaining transistors T1, T2, T5, T6, T7, M1, and M3 may be formed as polysilicon transistors including silicon semiconductors and may include a polysilicon semiconductor layer as an active layer. For example, the active layer may be formed through a low-temperature polysilicon process (for example, an LTPS process). For example, the polysilicon transistors may be P-type polysilicon transistors. Since polysilicon semiconductor transistors have the advantage of fast response speed, they can be applied to switching elements that require fast switching.

Figure 8:
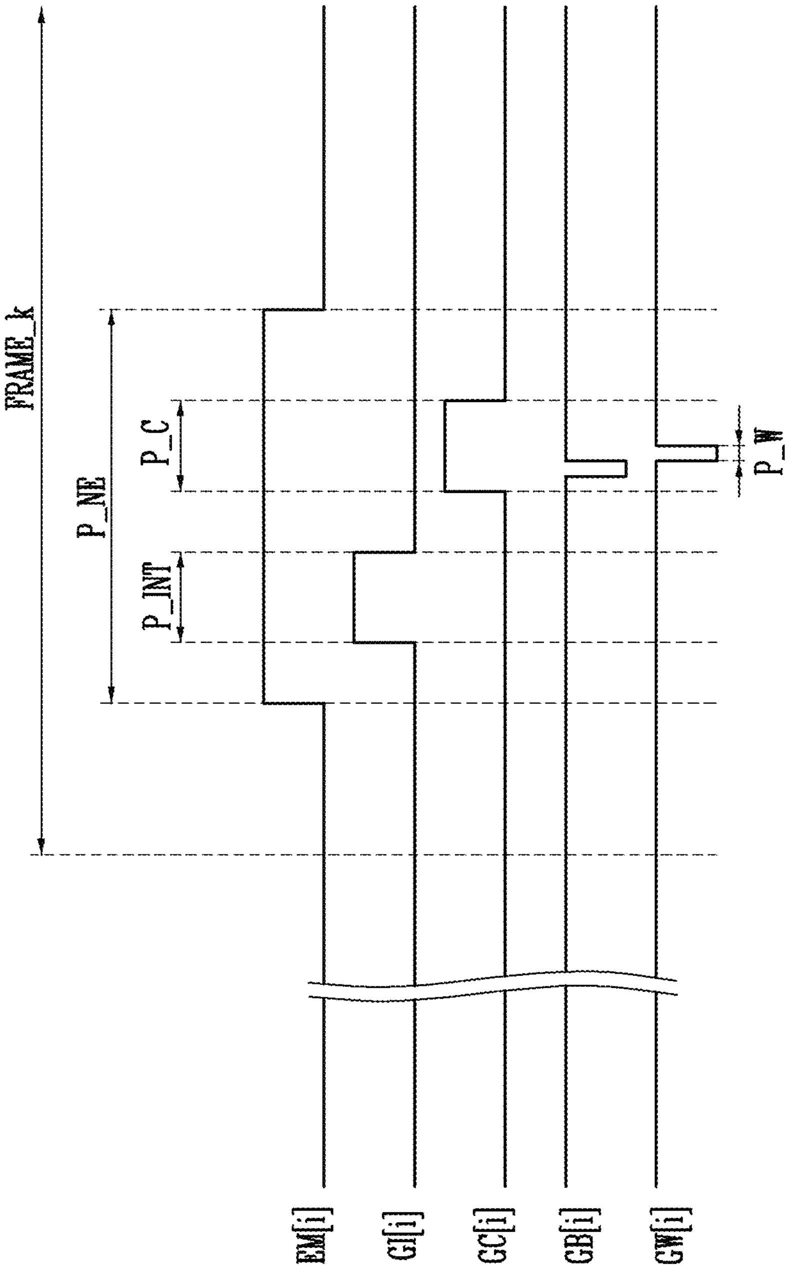
FIG. 8 is a waveform diagram illustrating an operation process of the sub-pixel of FIG. 7 according to an embodiment.

FIG. 8 is a waveform diagram illustrating an operation process of the sub-pixel of FIG. 7.

Referring to FIGS. 7 and 8, the emission control signal EM[i] may be provided to the i-th emission control line Ei, the second scan signal GI[i] may be provided to the (2i)th scan line S2*i*, the third scan signal GC[i] may be provided to the (3i)th scan line S3*i*, the fourth scan signal GB[i] may be provided to the (4i)th scan line S4*i*, and the first scan signal GW[i] may be provided to the (1i)th scan line S1*i*.

A k-th frame section FRAME_k may include a non-emission section P_NE, and the non-emission section P_NE (or the k-th frame section FRAME_k) may include an initialization section P_INT, a compensation section P_C, and a write section P_W. The write section P_W may be included in the compensation section P_C.

In the non-emission section P_NE, the emission control signal EM[i] may have a high level. In response to the emission control signal EM[i] of the high level, the fifth transistor T5 and the sixth transistor T6 may be turned off, and the sub-pixel PX may not emit light.

In the initialization section P_INT, the second scan signal GI[i] may have a high level. In response to the second scan signal GI[i] of the high level, the third transistor T3 may be turned on, and the first initialization power source voltage Vint1 of the third power source line PL3 may be provided to the first node N1 (or the gate electrode of the first transistor T1).

Thereafter, during the compensation section P_C, the third scan signal GC[i] may have a high level. In response to the third scan signal GC[i] of the high level, the fourth transistor T4 may be turned on, and the first transistor T1 may be connected in the form of a diode.

In the write section P_W, the first scan signal GW[i] may have a low level. In response to the first scan signal GW[i] of the low level, the second transistor T2 may be turned on, and a data signal may be provided from the j-th data line Dj to the second node N2. In addition, since the fourth transistor T4 is turned on in response to the third scan signal GC[i] of the high level, the data signal may be transmitted from the second node N2 to the first node N1 through the first transistor T1 and the fourth transistor T4. Since the first transistor T1 is connected in the form of a diode by the turned-on fourth transistor T4, the voltage of the first node N1 may be a voltage compensated by a threshold voltage of the first transistor T1 from the data signal.

Before the write section P_W, the fourth scan signal GB[i] may have a low level. In response to the fourth scan signal GB[i] of the low level, the seventh transistor T7 may be turned on, and the second initialization power source voltage Vint2 may be supplied to the first electrode of the light emitting element LD. The fourth scan signal GB[i] may be the first scan signal (for example, GW[i−1]) provided to the previous row, but the present disclosure is not limited thereto.

After the non-emission section P_NE ends, the emission control signal EM[i] may have a low level. In response to the emission control signal EM[i] of the low level, the fifth transistor T5 and the sixth transistor T6 may be turned on, and a current path may be formed from the first power source line PL1 to the second power source line PL2 via the fifth transistor T5, the first transistor T1, the sixth transistor T6, and the light emitting element LD. A driving current in response to the voltage of the first node N1 (for example, the data signal) may flow through the light emitting element LD according to the operation of the first transistor T1, and the light emitting element LD may emit light with a luminance corresponding to the driving current.

Figure 9:
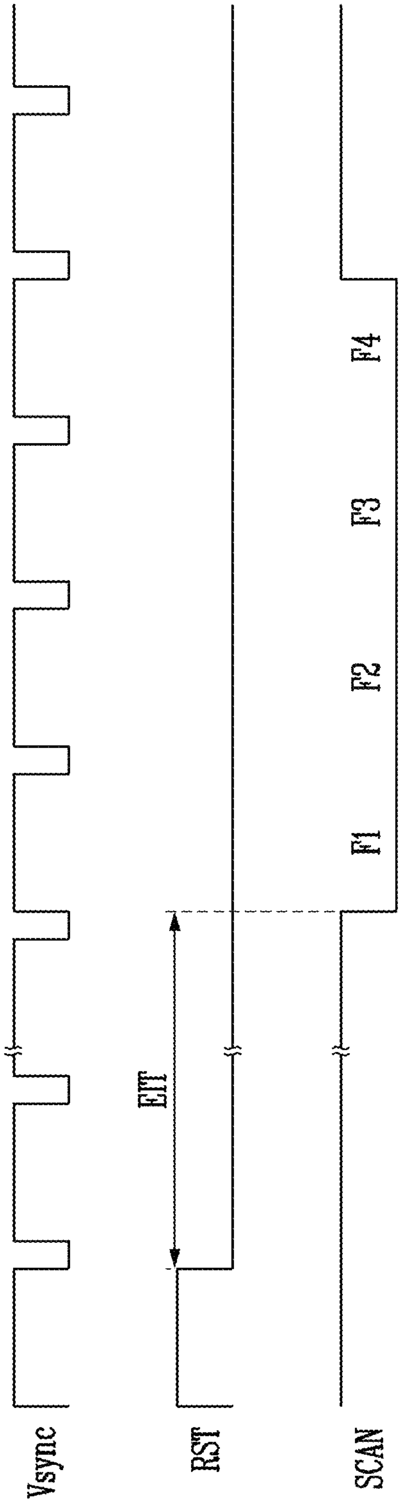
FIG. 9 is a waveform diagram illustrating an operation process of the light-sensing pixel of FIG. 7 according to an embodiment.
Figure 10:
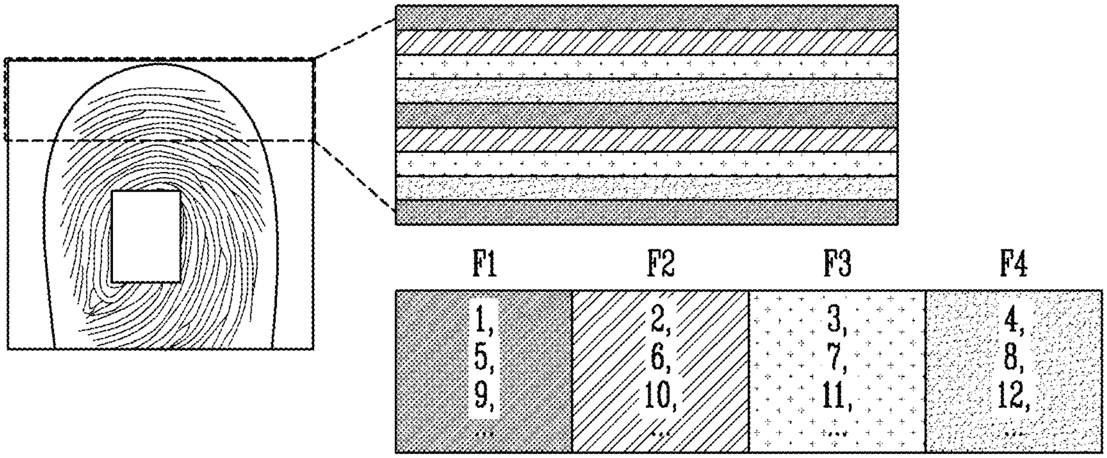
FIG. 10 is a diagram illustrating the order in which a sensing signal is detected from the light-sensing pixels, based on the waveform diagram of FIG. 9.

FIG. 9 is a waveform diagram illustrating an operation process of the light-sensing pixel of FIG. 7. FIG. 10 is a diagram illustrating the order in which a sensing signal is detected from light-sensing pixels, based on the waveform diagram of FIG. 9. In FIG. 9, Vsync may mean a vertical synchronization signal, and one cycle may represent one frame period. In FIG. 9, the sensing scan signal SCAN being set to a low state indicates that the sensing signal is detected during a corresponding frame period.

The reset signal RST may be provided to the reset control line RSTL. The sensing scan signal SCAN[i] may be provided to the sensing scan line SSi. Here, the sensing scan signal SCAN[i] may be the same signal as the first scan signal GW[i].

Referring to FIGS. 7 and 9, the sensing signal from the light-sensing pixel PSRik may be detected during a plurality of frames, for example, four frame periods F1, F2, F3, and F4.

In an embodiment, the reset signal RST may be supplied to the reset control line RSTL before the sensing signal is detected from the light-sensing pixel PSRik. For example, the reset signal RST may be supplied during one frame period.

When the reset signal RST of a high level is supplied from the reset circuit 2141 to the reset control line RSTL, the second transistor M2 may be turned on. When the second transistor M2 is turned on, the reset voltage VRST may be applied to the first node N1. In this case, the voltage of the first node N1 may be reset by the reset voltage VRST.

Afterwards, during a predetermined frame time, for example, an exposure time EIT, light may be incident on the light receiving element LRD, and the voltage of the first node N11 may be changed by the photoelectric conversion function of the light receiving element LRD. After the predetermined exposure time EIT, the sensing signal may be detected from light-sensing pixels PSRik in response to the sensing scan signal SCAN during four frame periods F1 to F4.

When the sensing scan signal SCAN[i] of a low level is supplied to the sensing scan line SSi, the third transistor M3 may be turned on. When the third transistor M3 is turned on, a current (or the sensing signal) may flow from the second power source line PL12 to the k-th readout line RXk in response to the voltage of the first node N11.

For example, when a user's touch input occurs on the display unit 112, a current corresponding to light reflected by a user (for example, a user's finger) may flow to the k-th readout line RXk. The current flowing to the readout line RXk may be the sensing signal, and a user's fingerprint may be detected based on the sensing signal. For example, the user's touch input may be detected based on the sensing signal.

The sensing signal from the light-sensing pixels PSR may be detected during the plurality of frame periods, for example, four frame periods F1 to F4, considering the delay of the readout circuit 2142.

Referring to FIG. 10, during a first frame period F1, a sensing signal may be detected from light-sensing pixels PSR located on some odd-numbered horizontal lines. For example, during the first frame period F1, a sensing signal may be supplied to the readout circuit 2142 from light-sensing pixels PSR located on first, fifth, ninth, . . . -th horizontal lines.

During a second frame period F2, a sensing signal may be detected from light-sensing pixels PSR located on some even-numbered horizontal lines. For example, during the second frame period F2, a sensing signal may be supplied to the readout circuit 2142 from light-sensi ng pixels PSR located on second, sixth, tenth, . . . -th horizontal lines.

During a third frame period F3, a sensing signal may be detected from light-sensing pixels PSR located on the remaining odd-numbered horizontal lines. For example, during the third frame period F3, a sensing signal may be supplied to the readout circuit 2142 from light-sensing pixels PSR located on third, seventh, eleventh, . . . -th horizontal lines.

During a fourth frame period F4, a sensing signal may be detected from light-sensing pixels PSR located on the remaining even-numbered horizontal lines. For example, during the fourth frame period F4, a sensing signal may be supplied to the readout circuit 2142 from light-sensing pixels PSR located on fourth, eighth, twelfth, . . . -th horizontal lines.

Through this process, a touch input (for example, a fingerprint input) on the display unit 112 can be detected.

Figure 11:
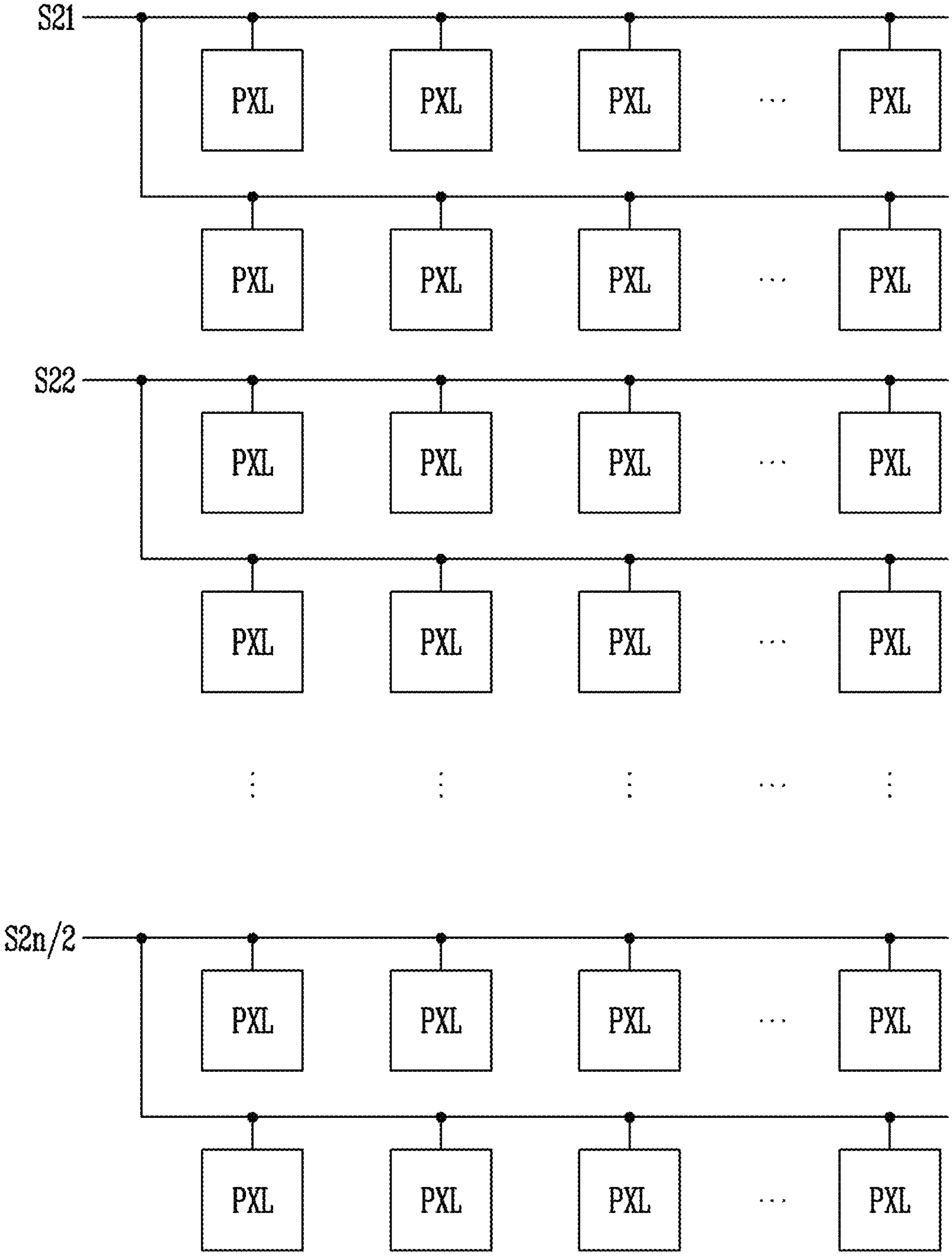
FIG. 11 is a diagram illustrating second scan lines according to an embodiment.
Figure 12:
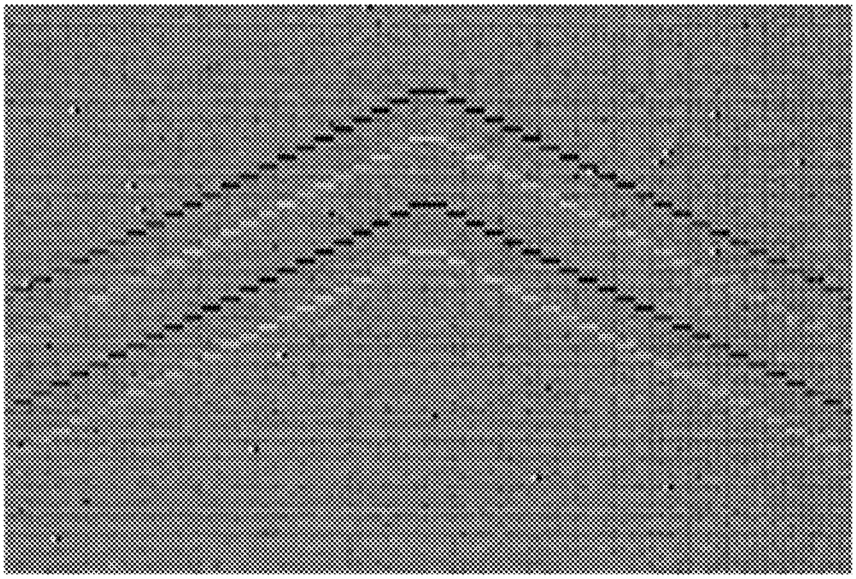
FIG. 12 is a diagram illustrating a sensing image by the sensing signal.

FIG. 11 is a diagram illustrating second scan lines according to an embodiment. FIG. 12 is a diagram illustrating a sensing image by the sensing signal.

Referring to FIG. 11, each of second scan lines S21 to S2*n*/2 may be electrically connected to sub-pixels PXL arranged on two horizontal lines. For example, a first second scan line S21 may be electrically connected to sub-pixels PXL located on first and second horizontal lines. For example, a second second scan line S22 may be electrically connected to sub-pixels PXL located on third and fourth horizontal lines. For example, a (n/2)th second scan line S2*n*/2 may be electrically connected to sub-pixels PXL located on an (n−1)th horizontal line and an n-th horizontal line.

Even if each of the second scan lines S21 to S2*n*/2 is connected to sub-pixels PXL located on two horizontal lines, the operation process of each sub-pixel PXL may be the same as described with reference to FIGS. 7 and 8, and therefore, redundant description will be omitted.

As described with reference to FIG. 4, the connection line CNL and the bridge line BRL may be formed in the display unit 112. The connection line CNL and the bridge line BRL may partially overlap (or be located adjacent to) the scan lines S1 to Sn formed on the display unit 112, which may cause signal interference due to coupling.

For example, when the sensing signal is generated from the light-sensing pixels PSR through the processes of FIGS. 9 and 10, noise in the form of diagonal lines may be detected in the sensing image corresponding to the shape of the contact holes CH1 to CH4, as shown in FIG. 12. For example, the noise in the form of diagonal lines may be included in the sensing signal of the light-sensing pixels PSR located on odd-numbered horizontal lines.

Figure 13:
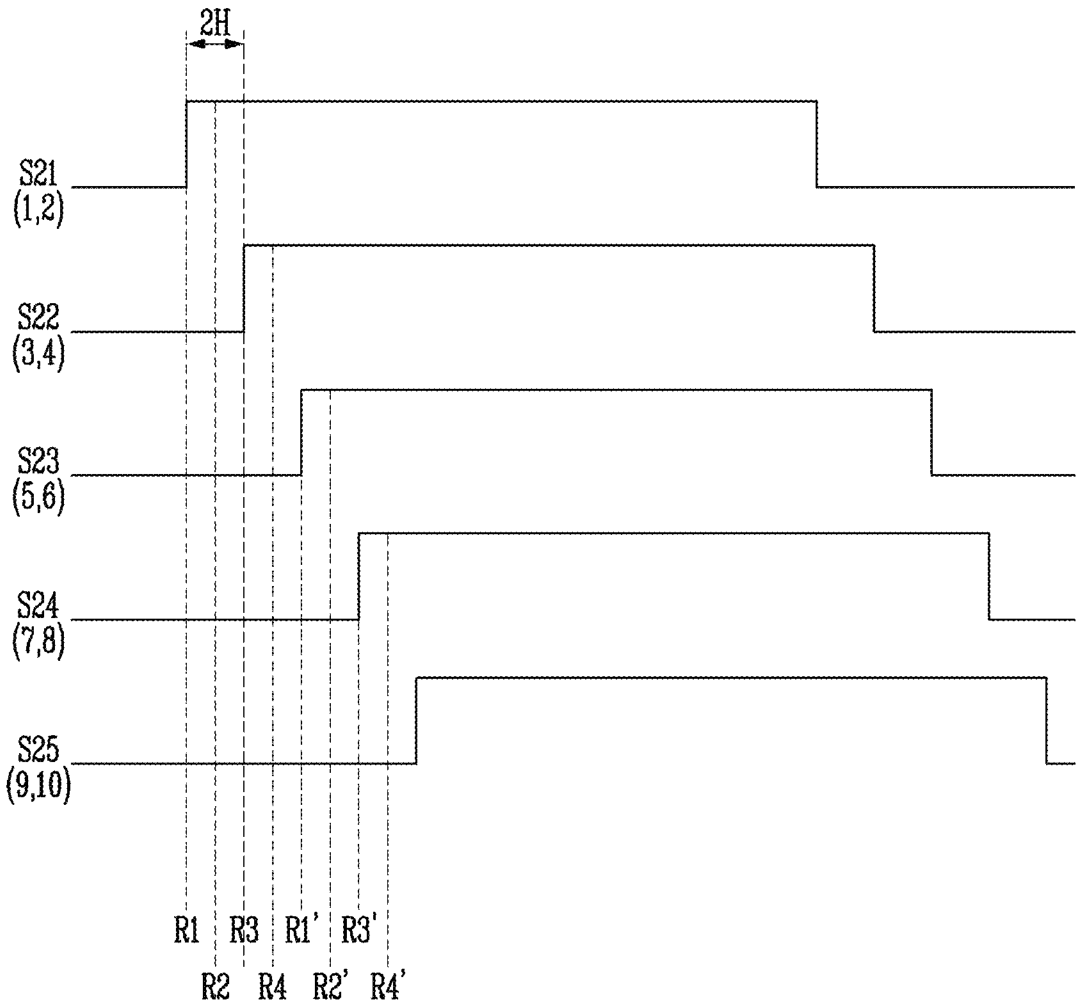
FIG. 13 is a diagram illustrating a principle of noise in the form of diagonal lines being generated from the light-sensing pixels.

FIG. 13 is a diagram illustrating a principle of noise in the form of diagonal lines being generated from the light-sensing pixels. In FIG. 13, R1, R2, R3, and R4 represent time points when sensing signals are detected by the readout circuit 2142. In FIGS. 13, (1,2), (3,4), (5,6), (7,8), and (9,10) may represent horizontal lines where second scan lines S21, S22, S23, S24, S25, . . . are located.

Referring to FIG. 13, the second scan signal GI may be sequentially supplied to the second scan lines S21 to S25, . . . with an interval of two horizontal periods 2H.

The time point R1 when the sensing signal is detected by a first horizontal line may overlap with the time point when the second scan signal GI is supplied to the first horizontal line (and a second horizontal line) (that is, the time point at which the voltage rises from a low level to a high level). In this case, noise may be included in the sensing signal due to the coupling between the first second scan line S21 and the connection line CNL and the bridge line BRL.

The time point R3 when the sensing signal is detected in a third horizontal line may overlap with the time point when the second scan signal GI is supplied to the third horizontal line (and a fourth horizontal line). In this case, noise may be included in the sensing signal due to the coupling between the second second scan line S22 and the connection line CNL and the bridge line BRL.

The time point R1' when the sensing signal is detected in a fifth horizontal line may overlap with the time point when the second scan signal GI is supplied to the fifth horizontal line (and a sixth horizontal line). In this case, noise may be included in the sensing signal due to the coupling between a third second scan line S23 and the connection line CNL and the bridge line BRL.

The time point R3' when the sensing signal is detected in a seventh horizontal line may overlap with the time point when the second scan signal GI is supplied to the seventh horizontal line (and an eighth horizontal line). In this case, noise may be included in the sensing signal due to the coupling between a fourth second scan line S24 and the connection line CNL and the bridge line BRL.

The time point R2 when the sensing signal is detected in the second horizontal line may not overlap with the time point when the second scan signal GI is supplied to the first horizontal line (and the second horizontal line) (that is, the time point at which the voltage rises from a low level to a high level). Therefore, the sensing signal detected at the time point R2 may not include noise.

The time point R4 when the sensing signal is detected in the fourth horizontal line may not overlap with the time point when the second scan signal GI is supplied to the third horizontal line (and the fourth horizontal line). Therefore, the sensing signal detected at the time point R4 may not include noise.

The time point R2' when the sensing signal is detected in the sixth horizontal line may not overlap with the time point when the second scan signal GI is supplied to the fifth horizontal line (and the sixth horizontal line). Therefore, the sensing signal detected at the time point R2' may not include noise.

The time point R4' when the sensing signal is detected in the eighth horizontal line may not overlap with the time point when the second scan signal GI is supplied to the seventh horizontal line (and the eighth horizontal line). Therefore, the sensing signal detected at the time point R2 may not include noise.

The readout circuit 2142 may receive sensing signals from the light-sensing pixels PSR located on the first horizontal line and the fifth horizontal line, respectively, at the time point R1 and the time point R1' of the first frame period F1. The readout circuit 2142 may receive sensing signals from the light-sensing pixels PSR located on the second horizontal line and the sixth horizontal line, respectively, at the time point R2 and the time point R2' of the second frame period F2. The readout circuit 2142 may receive sensing signals from the light-sensing pixels PSR located on the third horizontal line and the seventh horizontal line, respectively, at the time point R3 and the time point R3' of the third frame period F3. The readout circuit 2142 may receive sensing signals from the light-sensing pixels PSR located on the fourth horizontal line and the eighth horizontal line, respectively, at the time point R4 and the time point R4' of the fourth frame period F4.

As described above, the time point when the sensing signal is supplied from the light-sensing pixels PSR located on the odd-numbered horizontal lines may overlap with the time point when the second scan signal GI is supplied. Thus, the sensing signal generated from the light-sensing pixels PSR located on the odd-numbered horizontal lines may include noise in the form of diagonal lines, as shown in FIG. 12.

Figure 14:
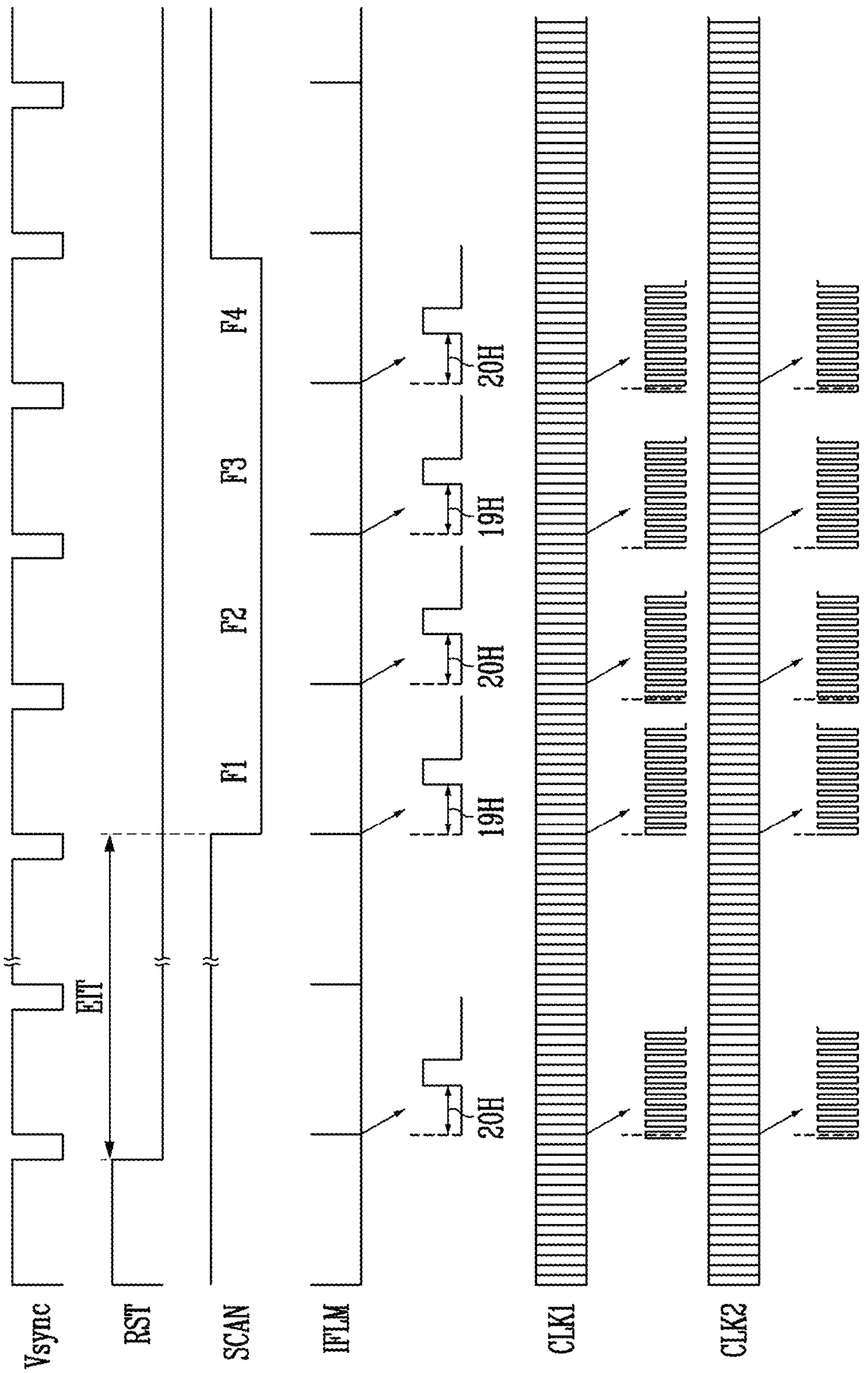
FIGS. 14 and 16 are waveform diagrams illustrating an operation process of the light-sensing pixel of FIG. 7 according to an embodiment.
Figure 15:
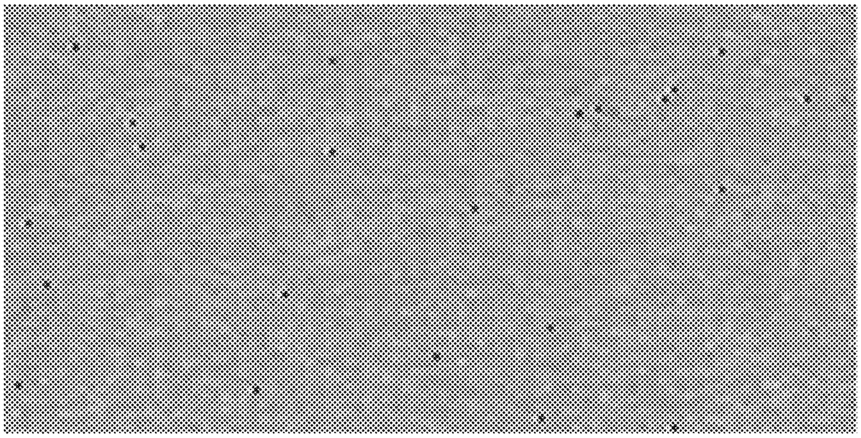
FIG. 15 is a diagram illustrating a sensing image by a sensing signal from the light-sensing pixel based on the waveform diagram of FIG. 14.
Figure 16:
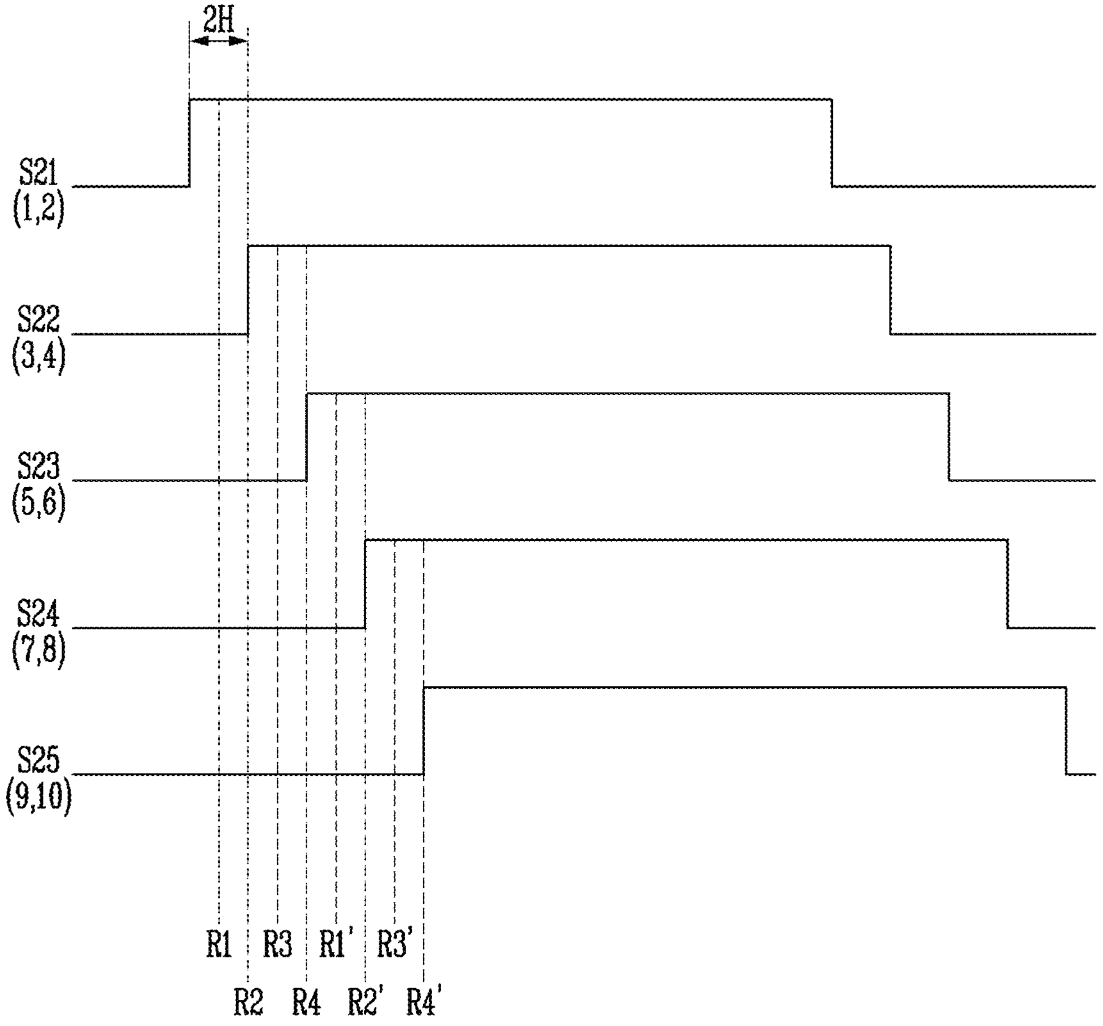

FIGS. 14 and 16 are waveform diagrams illustrating an operation process of the light-sensing pixel of FIG. 7 according to an embodiment. FIG. 15 is a diagram illustrating a sensing image by a sensing signal from the light-sensing pixel based on the waveform diagram of FIG. 14. In FIG. 14, Vsync may mean a vertical synchronization signal, and one cycle may represent one frame period.

Referring to FIG. 14, the sensing signal from the light-sensing pixels PSR may be detected during a plurality of frames, for example, four frame periods F1, F2, F3, and F4.

In an embodiment, the reset signal RST may be supplied to the reset control line RSTL before the sensing signal is detected from the light-sensing pixel PSRik. For example, the reset signal RST may be supplied during one frame period.

When the reset signal RST of a high level is supplied from the reset circuit 2141 to the reset control line RSTL, the second transistor M2 may be turned on. When the second transistor M2 is turned on, the reset voltage VRST may be applied to the first node N1. In this case, the voltage of the first node N1 may be reset by the reset voltage VRST.

Afterwards, during a predetermined frame time, for example, an exposure time EIT, light may be incident on the light receiving element LRD, and the voltage of the first node N11 may be changed by the photoelectric conversion function of the light receiving element LRD. After the predetermined exposure time EIT, the sensing signal may be detected from light-sensing pixels PSR in response to the sensing scan signal SCAN during four frame periods F1 to F4.

When the sensing scan signal SCAN[i] of a low level is supplied to the sensing scan line SSi, the third transistor M3 may be turned on. When the third transistor M3 is turned on, a current (or the sensing signal) may flow from the second power source line PL12 to the k-th readout line RXk in response to the voltage of the first node N11.

For example, when a user's touch input occurs on the display unit 112, a current corresponding to light reflected by a user (for example, a user's finger) may flow to the k-th readout line RXk. The current flowing to the readout line RXk may be the sensing signal, and a user's fingerprint may be detected based on the sensing signal. For example, the user's touch input may be detected based on the sensing signal.

The sensing signal from the light-sensing pixels PSR may be detected during the plurality of frame periods, for example, four frame periods F1 to F4, considering the delay of the readout circuit 2142.

During a period in which the display device DD is normally driven, the controller 2123 may supply the initialization start signal IFLM 20 horizontal periods 20H after the start of a frame. The scan driver 2121 (or the initialization driver 2121*b*) receiving the initialization start signal IFLM may generate the second scan signal GI after 20 horizontal periods 20H and sequentially supply the second scan signal GI to the second scan lines S21 to S2*n*/2.

Additionally, the controller 2123 may change the time point when the initialization start signal IFLM is supplied during some frame periods among the plurality of frames in which the sensing signal is detected.

For example, during a first frame period 1F and a third frame period 3F when the sensing signal is detected, the initialization start signal IFLM may be supplied by shifting the time point by one horizontal period 1H. For example, the controller 2123 may supply the initialization start signal IFLM one horizontal period 1H earlier during the first frame period 1F and the third frame period 3F. For example, the controller 2123 may supply the initialization start signal IFLM 19 horizontal periods 19H after the start of the frame.

In addition, in the first frame period 1F and the third frame period 3F, a time point when the clock signals CLK1 and CLK2 is supplied may also be shifted by one horizontal period 1H in response to the shift of the initialization start signal IFLM. For example, the controller 2123 may supply the clock signals CLK1 and CLK2 one horizontal period 1H earlier during the first frame period 1F and the third frame period 3F. In this case, the scan driver 2121 (or the initialization driver 2121*b*) may generate the second scan signal GI to be preceded by one horizontal period 1H.

During a second frame period 2F and a fourth frame period 4F, the controller 2123 may supply the initialization start signal IFLM in the same manner (that is, after 20 horizontal periods 20H after a frame starts) as during the normally operating periods.

As described above, when the initialization start signal IFLM is supplied one horizontal period 1H earlier during the first frame period 1F and the third frame period 3F, the sensing image by the sensing signal detected in the readout circuit 2142 may not include noise in the form of diagonal lines as shown in FIG. 15.

The readout circuit 2142 may maintain the time point R1, R2, R3, R4, R1', R2', R3', and R4' at which the sensing signal is detected at a constant time point, as shown in FIG. 13 and FIG. 16, regardless of the shift of the initialization start signal IFLM.

Referring to FIG. 16, when the second scan signal GI is shifted by one horizontal period 1H, the time point R1 may not overlap with the time point when the second scan signal GI is supplied to the first horizontal line (and the second horizontal line) (that is, the time point at which the voltage rises from a low level to a high level). Therefore, the sensing signal detected at the time point R1 may not include noise.

When the second scan signal GI is shifted by one horizontal period 1H, the time point R3 may not overlap with the time point when the second scan signal GI is supplied to the third horizontal line (and the fourth horizontal line). Therefore, the sensing signal detected at the time point R3 may not include noise.

When the second scan signal GI is shifted by one horizontal period 1H, the time point R1' may not overlap with the time point when the second scan signal GI is supplied to the fifth horizontal line (and the sixth horizontal line). Therefore, the sensing signal detected at the time point R1' may not include noise.

When the second scan signal GI is shifted by one horizontal period 1H, the time point R3' may not overlap with the time point when the second scan signal GI is supplied to the seventh horizontal line (and the eighth horizontal line). Therefore, the sensing signal detected at the time point R3' may not include noise.

That is, in an embodiment of the present disclosure, during the first frame period 1F and the third frame period 3F in which sensing signals are detected from the light-sensing pixels PSR located on odd-numbered horizontal lines, the second scan signal GI may be supplied to be preceded by one horizontal period 1H, thereby preventing noise in the form of diagonal lines from being included in the sensing signal.

Additionally, during the second frame period 2F and the fourth frame period 4F in which sensing signals are detected from the light-sensing pixels PSR located on even-numbered horizontal lines, the second scan signal GI may not be shifted. Therefore, as described with reference to FIG. 13, time points R2, R4, R2', and R4' may not overlap with the time point when the second scan signal GI is supplied.

Figure 17:
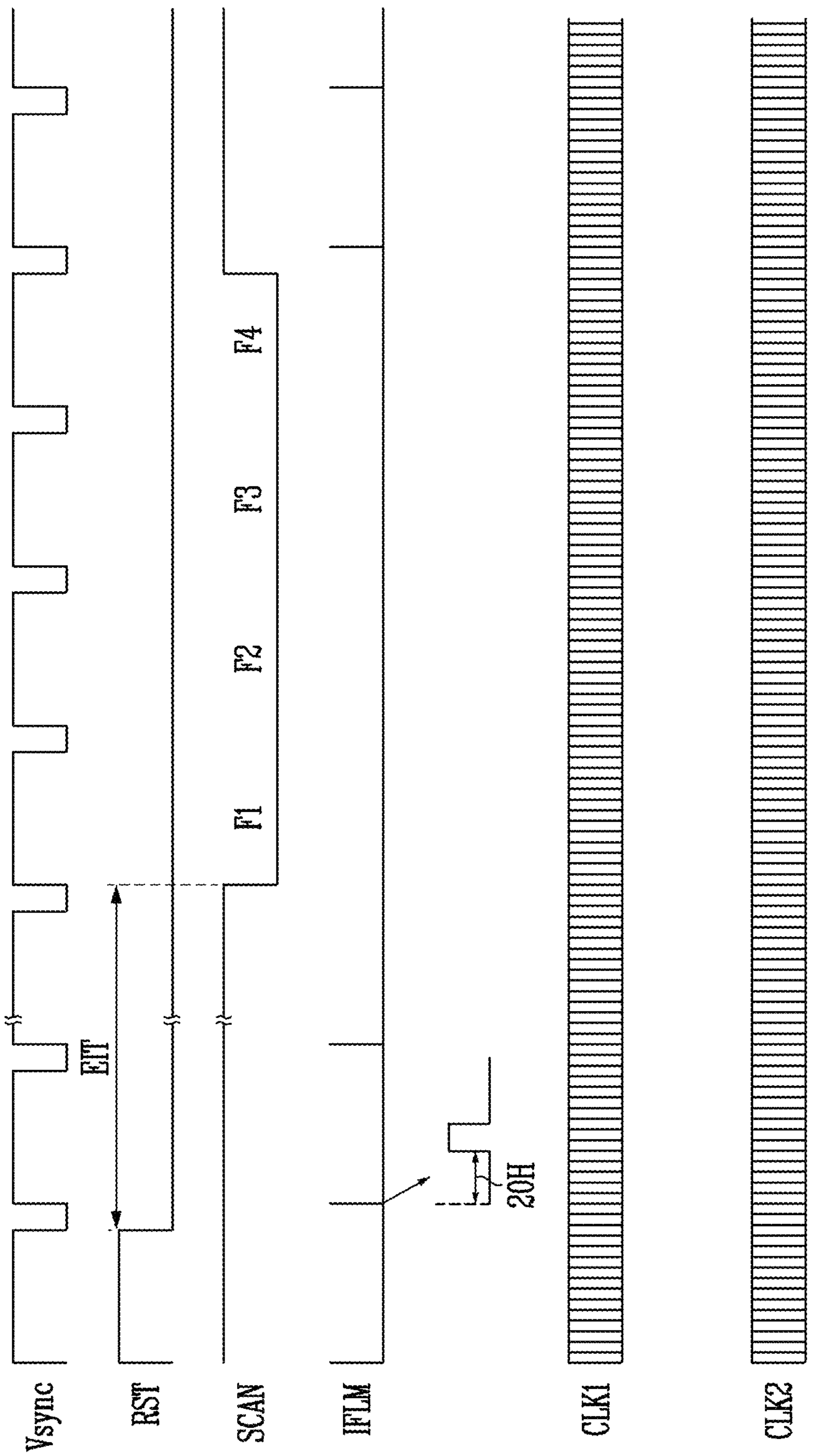
FIGS. 17 and 18 are waveform diagrams illustrating an operation process of the light-sensing pixel of FIG. 7 according to an embodiment.
Figure 18:
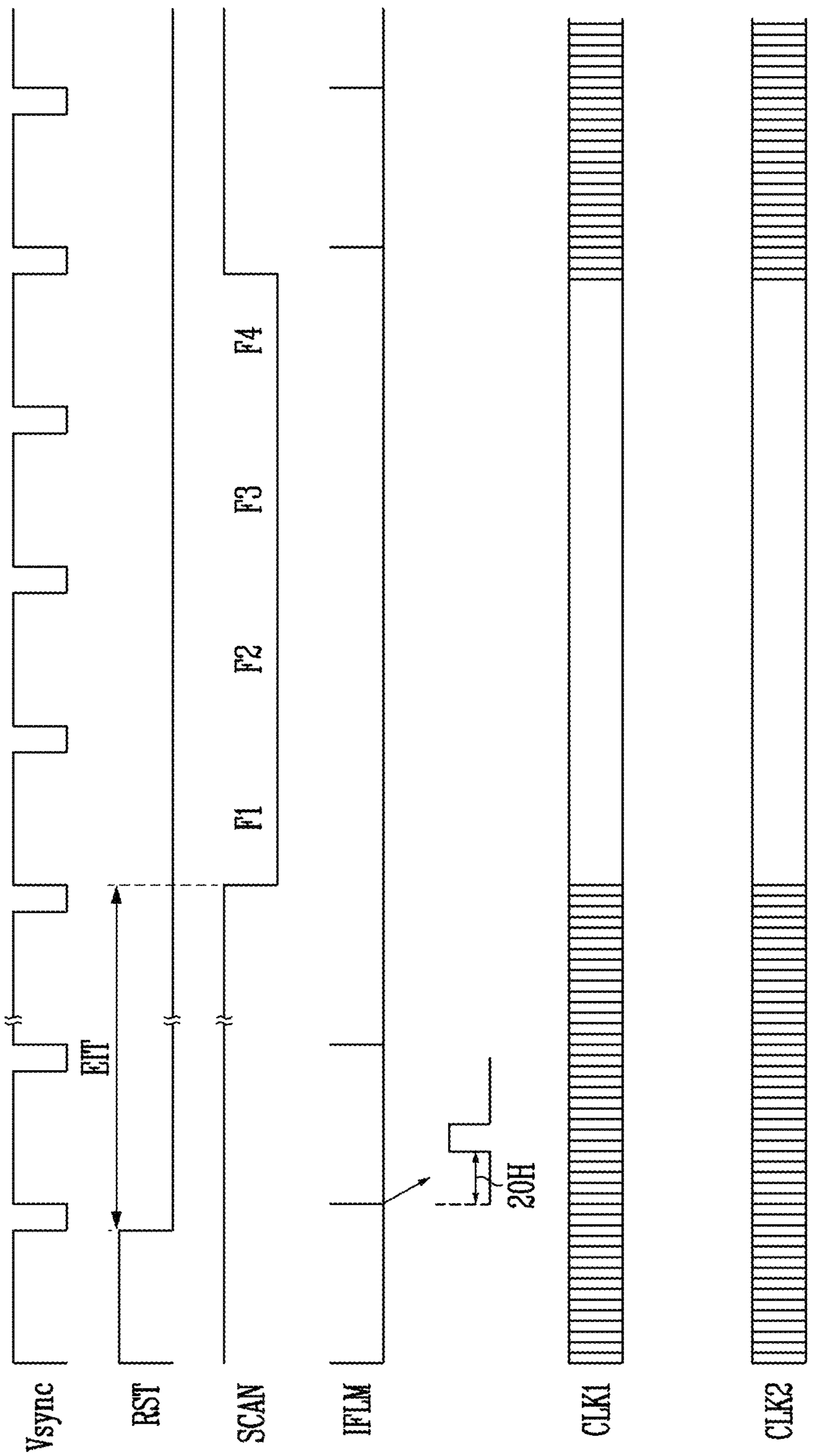

FIGS. 17 and 18 are waveform diagrams illustrating an operation process of the light-sensing pixel of FIG. 7 according to an embodiment.

Referring to FIG. 17, the sensing signal from the light-sensing pixels PSR may be detected during a plurality of frames, for example, four frame periods F1, F2, F3, and F4.

The controller 2123 may not supply the initialization start signal IFLM during the plurality of frame periods (that is, F1 to F4) in which the sensing signal is detected from the light-sensing pixels PSR. The second scan signal GI may not be supplied during the plurality of frame periods (that is, F1 to F4), and thus, noise due to the second scan signal GI may not be included in the sensing signal.

However, the sub-pixels PXL may maintain the data signal of the previous frame during the plurality of frame periods F1 to F4. Therefore, the display unit 112 may display the same image during the plurality of frame periods F1 to F4.

Additionally, the controller 2123 may not supply the write start signal WFLM, the compensation start signal CFLM, and the control start signal BFLM during the plurality of frame periods (that is, F1 to F4) in which the sensing signal is detected from the light-sensing pixels PSR. Thus, the first scan signal GW, the third scan signal GC, and the fourth scan signal GB may not be supplied during the plurality of frame periods (that is, F1 to F4).

As shown in FIG. 18, the controller 2123 may not supply the clock signals CLK1 and CLK2 to the scan driver 2121 (or the initialization driver 2121*b*) during the plurality of frame periods F1 to F4. In addition, the controller 2123 may not supply clock signals CLK to the scan driver 2121 (or the write driver 2121*a*), the compensation driver 2121*c*, and the control driver 2121*d* during the plurality of frame periods F1 to F4. Power consumption can be reduced by not supplying clock signals CLK1, CLK2 during the plurality of frame periods F1 to F4.

Figure 19:
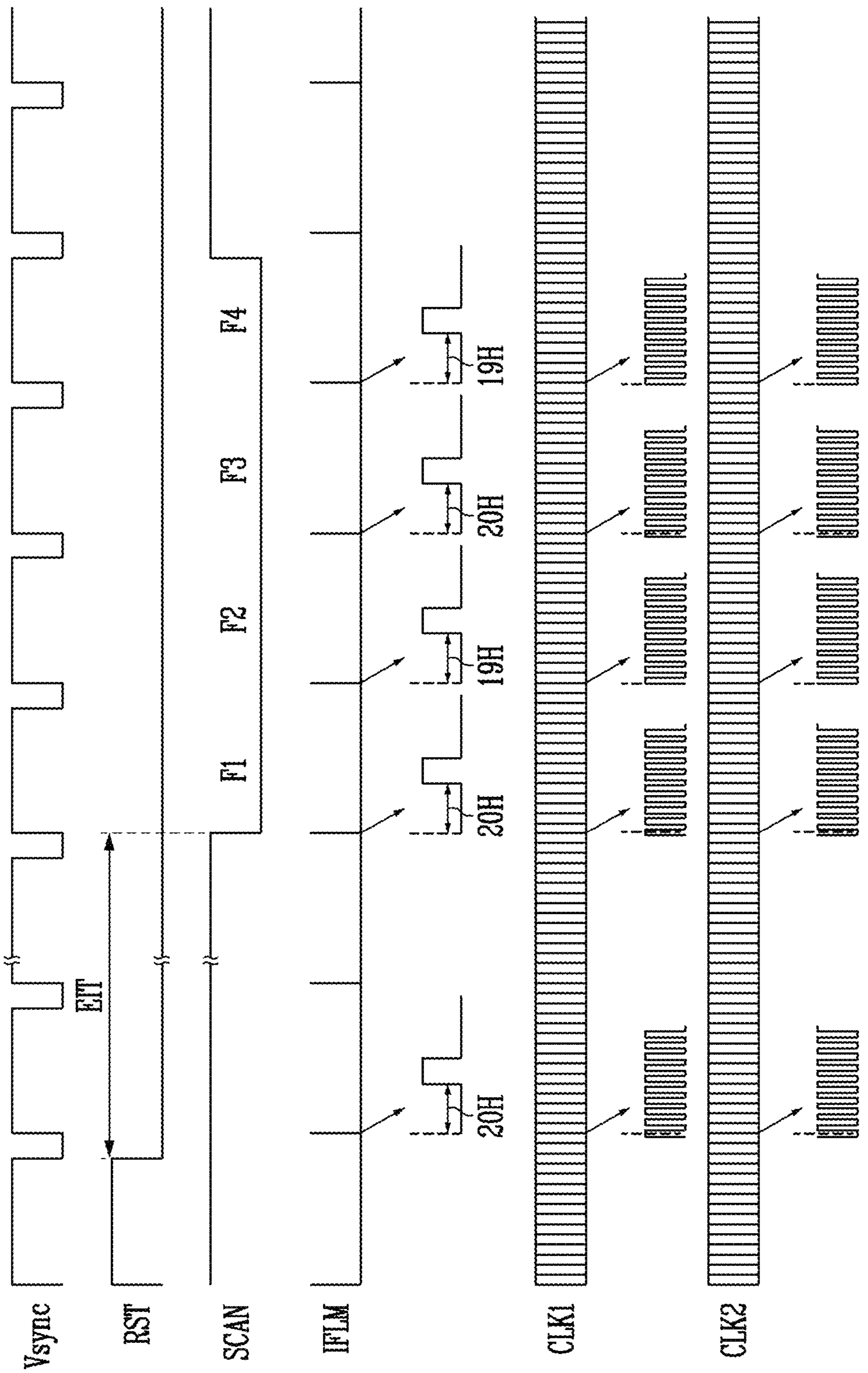
FIG. 19 is a waveform diagram illustrating an operation process of the light-sensing pixel of FIG. 7 according to an embodiment.

FIG. 19 is a waveform diagram illustrating an operation process of the light-sensing pixel of FIG. 7 according to an embodiment.

Referring to FIG. 19, the sensing signal from the light-sensing pixels PSR may be detected during a plurality of frames, for example, four frame periods F1, F2, F3, and F4.

The sensing signal from the light-sensing pixels PSR may be detected during the plurality of frame periods, for example, four frame periods F1 to F4, considering the delay of the readout circuit 2142.

During a period in which the display device DD is normally driven, the controller 2123 may supply the initialization start signal IFLM 20 horizontal periods 20H after the start of a frame. The scan driver 2121 (or the initialization driver 2121*b*) receiving the initialization start signal IFLM may generate the second scan signal GI after 20 horizontal periods 20H and sequentially supply the second scan signal GI to the second scan lines S21 to S2*n*/2.

The controller 2123 may change the time point when the initialization start signal IFLM is supplied during some frame periods among the plurality of frames in which the sensing signal is detected.

For example, during the second frame period 2F and the fourth frame period 4F in which the sensing signal is detected, the time point when the initialization start signal IFLM is supplied may be shifted by one horizontal period 1H. For example, the controller 2123 may supply the initialization start signal IFLM one horizontal period 1H earlier during the second frame period 2F and the fourth frame period 4F. In this case, the controller 2123 may supply the initialization start signal IFLM 19 horizontal periods 19H after the start of the frame during the second frame period 2F and the fourth frame period 4F.

In addition, during the second frame period 2F and the fourth frame period 4F, the clock signals CLK1 and CLK2 may also be supplied by shifting the time point when the clock signals CLK1 and CLK2 is supplied by one horizontal period 1H in response to the shift of the initialization start signal IFLM. For example, the controller 2123 may supply the clock signals CLK1 and CLK2 to be preceded by one horizontal period 1H during the second frame period 2F and the fourth frame period 4F. In this case, the scan driver 2121 (or the initialization driver 2121*b*) may generate the second scan signal GI one horizontal period 1H earlier during the second frame period 2F and the fourth frame period 4F.

During the first frame period 1F and the third frame period 3F, the controller 2123 may supply the initialization start signal IFLM in the same manner (that is, 20 horizontal periods 20H after the start of a frame) as during the normally operating periods.

In an embodiment of the present invention, the frame in which the initialization start signal IFLM is shifted may be changed in accordance with the type of the display device DD. For example, the controller 2123 may shift the initialization start signal IFLM by one horizontal period 1H during a frame period in which noise in the form of diagonal lines occurs among the plurality of frames in which the sensing signal is detected.

Figure 20:
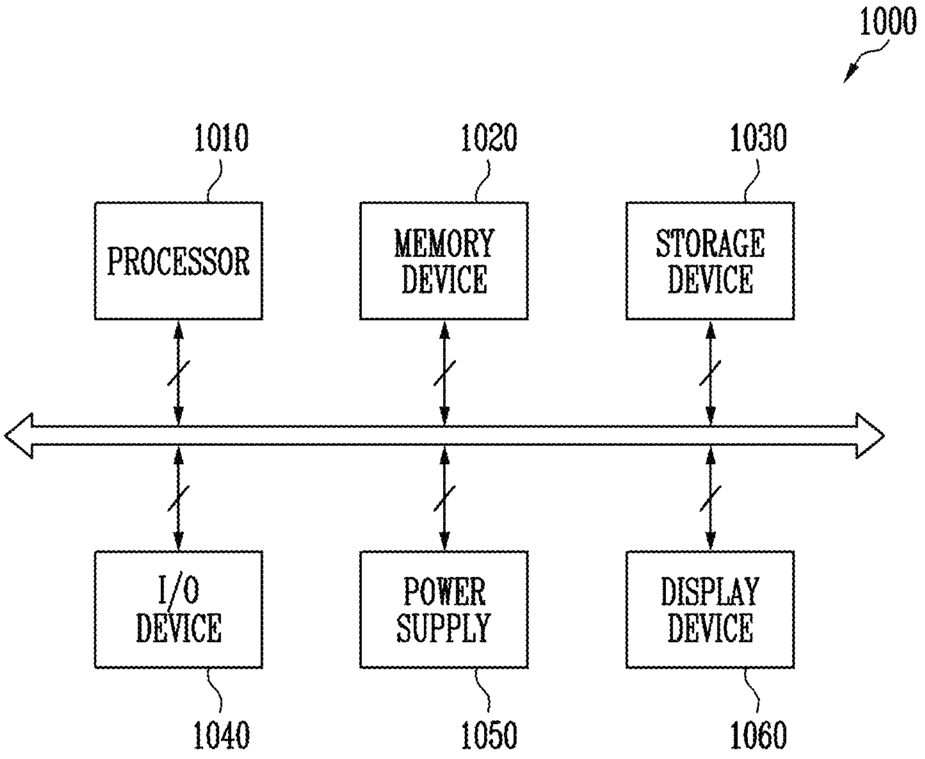
FIG. 20 is a block diagram schematically illustrating an electronic device according to an embodiment.
Figure 21:
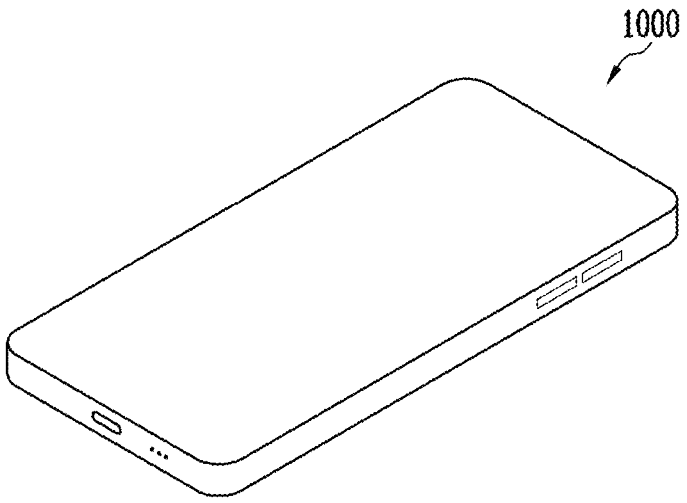
FIG. 21 is a diagram schematically illustrating an example in which the electronic device of FIG. 20 is implemented as a smartphone.
Figure 22:
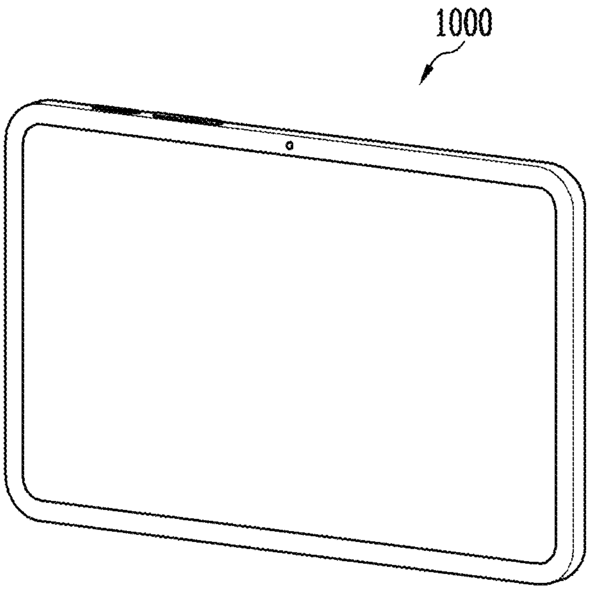
FIG. 22 is a diagram schematically illustrating an example in which the electronic device of FIG. 20 is implemented as a tablet PC.

FIG. 20 is a block diagram schematically illustrating an electronic device 1000 according to an embodiment. FIG. 21 is a diagram schematically illustrating an example in which the electronic device 1000 of FIG. 20 is implemented as a smartphone. FIG. 22 is a diagram schematically illustrating an example in which the electronic device 1000 of FIG. 20 is implemented as a tablet PC.

Referring to FIGS. 20 to 22, the electronic device 1000 may include a processor 1010, a memory device 1020, a storage device 1030, an input/output device 1040, a power supply 1050, and a display device 1060. The display device 1060 may be the display device as depicted in FIGS. 1, 2, and 5. The electronic device 1000 may further include several ports that can communicate with a video card, a sound card, a memory card, a universal serial bus (USB) device, and the like, or with other systems. In an embodiment, as shown in FIG. 21, the electronic device 1000 may be implemented as a smartphone. In an embodiment, as shown in FIG. 22, the electronic device 1000 may be implemented as a tablet PC. However, this is only an example, and the electronic device 1000 is not limited to the examples described above. For example, the electronic device 1000 may be implemented as a mobile phone, a video phone, a smart pad, a smart watch, a car navigation system, a computer monitor, a laptop, a head-mounted display device, or the like.

The processor 1010 may perform specific calculations or tasks. According to an embodiment, the processor 1010 may be a microprocessor, a central processing unit, an application processor, or the like. The processor 1010 may be connected to other components through an address bus, a control bus, a data bus, and the like. According to an embodiment, the processor 1010 may also be connected to an expansion bus, such as a peripheral component interconnect (PCI) bus.

The memory device 1020 may store data necessary for the operation of the electronic device 1000. For example, the memory device 1020 may include a non-volatile memory device such as an EPROM (erasable programmable read-only memory) device, an EEPROM (electrically erasable programmable read-only memory) device, a flash memory device, a PRAM (phase change random access memory) device, a RRAM (resistance random access memory) device, a NFGM (nano floating gate memory) device, a PoRAM (polymer random access memory) device, a MRAM (magnetic random access memory) device, or a FRAM (ferroelectric random access memory) device, and/or a volatile memory device such as a DRAM (dynamic random access memory) device, a SRAM (static random access memory) device, or a mobile DRAM device.

The storage device 1030 may include a solid state drive (SSD), a hard disk drive (HDD), a compact disc read only memory (CD-ROM), or the like.

The input/output device 1040 may include an input means such as a keyboard, a keypad, a touchpad, a touch screen, and a mouse, and an output means such as a speaker and a printer. According to an embodiment, the display device 1060 may be included in the input/output device 1040.

The power supply 1050 may supply power sources necessary for the operation of the electronic device 1000. For example, the power supply 1050 may be a power management integrated circuit (PMIC).

The display device 1060 may display an image corresponding to visual information of the electronic device 1000. In this case, the display device 1060 may be an organic light emitting display device or a quantum dot light emitting display device, but the present disclosure is not limited thereto. The display device 1060 may be connected to other components through the buses or other communication links.

A display device and a method of driving the same according to the embodiments of the present disclosure may prevent noise from being included in the sensing signal by changing the time point when the scan signal is supplied during some frame periods among the plurality of frame periods in which the sensing signal is detected from the light-sensing pixels.

However, effects and features of the present disclosure are not limited to the above-described effects and features, and may be variously extended without departing from the spirit and scope of the present disclosure.

As described above, the embodiments of the present disclosure have been described with reference to the drawings. However, those skilled in the art will appreciate that various modifications and changes can be made without departing from the spirit and scope of the present disclosure as set forth in the following claims.

What is claimed is:

1. A display device comprising:
sub-pixels connected to scan lines and data lines;
light-sensing pixels connected to sensing scan lines, readout lines, and a reset control line;
a scan driver supplying a scan signal to the scan lines; and
a controller supplying a start signal to the scan driver,
wherein the controller supplies the start signal at a first time point after a start of a frame during some frame periods among a plurality of frame periods in which a sensing signal is detected from the light-sensing pixels, and supplies the start signal at a second time point different from the first time point after the start of the frame during remaining frame periods.

2. The display device of claim 1, wherein the controller supplies the start signal at the first time point during a frame period in which the sensing signal is not detected.

3. The display device of claim 2, wherein the second time point is a time point shifted by one horizontal period compared to the first time point.

4. The display device of claim 3, wherein the second time point is a time point one horizontal period earlier than the first time point.

5. The display device of claim 3, wherein in response to the shift of the start signal, a clock signal supplied to the scan driver is shifted by one horizontal period.

6. The display device of claim 1, wherein the some frame periods are even-numbered frame periods among the plurality of frame periods, and the remaining frame periods are odd-numbered frame periods.

7. The display device of claim 1, wherein the some frame periods are odd-numbered frame periods among the plurality of frame periods, and the remaining frame periods are even-numbered frame periods.

8. The display device of claim 1, wherein each of the sub-pixels includes:
a light emitting element disposed between a first power source line and a second power source line;
a first transistor having a gate electrode connected to a first node, a first electrode connected to a second node, and a second electrode connected to a third node;
a second transistor connected between a data line among the data lines and the second node, and having a gate electrode connected to a first scan line among the scan lines; and
a third transistor connected between the first node and a third power source line, and having a gate electrode connected to a second scan line among the scan lines.

9. The display device of claim 8, wherein the scan driver includes:
a write driver supplying a first scan signal to the first scan line; and
an initialization driver supplying a second scan signal to the second scan line.

10. The display device of claim 9, wherein the start signal is supplied to the initialization driver.

11. The display device of claim 10, wherein the initialization driver supplies the second scan signal at different time points during the some frame periods and the remaining frame periods.

12. The display device of claim 8, wherein each of the sub-pixels further includes:
a fourth transistor connected between the first node and the third node, and having a gate electrode connected to a third scan line among the scan lines;
a fifth transistor connected between the first power source line and the second node, and having a gate electrode connected to an emission control line;
a sixth transistor connected between the third node and a first electrode of the light emitting element, and having a gate electrode connected to the emission control line; and
a seventh transistor connected between the first electrode of the light emitting element and a fourth power source line, and having a gate electrode connected to a fourth scan line among the scan lines.

13. The display device of claim 1, wherein each of the light-sensing pixels includes:
a first sensor transistor having a first electrode connected to a power source line to which a common voltage is supplied and a gate electrode connected to a sensor node;

a second sensor transistor connected between a power source line to which a reset voltage is supplied and the sensor node, and having a gate electrode connected to the reset control line;

a third sensor transistor connected between the first sensor transistor and a readout line among the readout lines, and having a gate electrode connected to a sensing scan line among the sensing scan lines; and a light receiving element connected between the sensor node and the second power source line.

14. The display device of claim 13, further comprising:

a reset circuit supplying a reset signal to the reset control line; and a readout circuit receiving the sensing signal from the readout lines.

15. The display device of claim 14, wherein the readout circuit receives the sensing signal from the light-sensing pixels disposed on some odd-numbered horizontal lines during a first frame period among the plurality of frame periods, receives the sensing signal from the light-sensing pixels disposed on some even-numbered horizontal lines during a second frame period among the plurality of frame periods, receives the sensing signal from the light-sensing pixels disposed on remaining odd-numbered horizontal lines during a third frame period among the plurality of frame periods, and receives the sensing signal from the light-sensing pixels disposed on remaining even-numbered horizontal lines during a fourth frame period among the plurality of frame periods.

16. The display device of claim 1, further comprising:

a substrate including a display area including a first area and a second area, and a non-display area;

the data lines disposed in each of the first area and the second area;

the readout lines disposed in each of the first area and the second area and spaced apart from the data lines;

connection lines extending from the first area to the second area and electrically connected to the readout lines disposed in the second area; and bridge lines extending from the second area to the first area and electrically connected to the data lines disposed in the first area.

17. A display device comprising:

sub-pixels, each of the sub-pixels including a light emitting element, receiving a data signal from a data line when a first scan signal is supplied to a first scan line, and initializing a gate electrode of a driving transistor when a second scan signal is supplied to a second scan line;

light-sensing pixels, each of the light-sensing pixels including a light receiving element and detecting an external input;

a write driver supplying the first scan signal to the first scan line in response to a write start signal;

an initialization driver supplying the second scan signal to the second scan line in response to an initialization start signal; and a controller supplying the write start signal and the initialization start signal to the write driver and the initialization driver, wherein the controller does not supply the initialization start signal to the initialization driver during a plurality of frame periods in which a sensing signal is detected from the light-sensing pixels.

18. The display device of claim 17, wherein the controller does not supply a clock signal to the initialization driver during the plurality of frame periods.

19. The display device of claim 17, wherein the write start signal is not supplied to the write driver during the plurality of frame periods.

20. An electronic device, comprising:

a processor to provide input image data; and a display device to display an image based on the input image data, wherein the display device comprises:

sub-pixels connected to scan lines and data lines;

light-sensing pixels connected to sensing scan lines, readout lines, and a reset control line;

a scan driver supplying a scan signal to the scan lines; and a controller supplying a start signal to the scan driver, wherein the controller supplies the start signal at a first time point after a start of a frame during some frame periods among a plurality of frame periods in which a sensing signal is detected from the light-sensing pixels, and supplies the start signal at a second time point different from the first time point after the start of the frame during remaining frame periods.

* * * * *